(12) United States Patent
McGuire, II et al.

(10) Patent No.: US 10,863,733 B2
(45) Date of Patent: Dec. 15, 2020

(54) ANIMAL TRAP

(71) Applicants: Rex Lee McGuire, II, San Diego, CA (US); Lawrence Steven Jackel, Solana Beach, CA (US)

(72) Inventors: Rex Lee McGuire, II, San Diego, CA (US); Lawrence Steven Jackel, Solana Beach, CA (US)

( * ) Notice: Subject to any disclaimer, the term of this patent is extended or adjusted under 35 U.S.C. 154(b) by 526 days.

(21) Appl. No.: 15/870,702

(22) Filed: Jan. 12, 2018

(65) Prior Publication Data

US 2018/0192630 A1  Jul. 12, 2018

Related U.S. Application Data

(60) Provisional application No. 62/445,647, filed on Jan. 12, 2017.

(51) Int. Cl.
| | | |
|---|---|---|
| *A01M 23/24* | (2006.01) | |
| *A01M 23/34* | (2006.01) | |
| *A01M 23/02* | (2006.01) | |
| *A01M 27/00* | (2006.01) | |
| *A01M 31/00* | (2006.01) | |

(52) U.S. Cl.
CPC ............ *A01M 23/24* (2013.01); *A01M 23/02* (2013.01); *A01M 27/00* (2013.01); *A01M 31/002* (2013.01)

(58) Field of Classification Search
CPC ............................. A01M 23/24; A01M 23/34
See application file for complete search history.

(56) References Cited

U.S. PATENT DOCUMENTS

| | | | | |
|---|---|---|---|---|
| 3,292,591 | A | * | 12/1966 | Wood .................... A01M 23/34 119/804 |
| 4,208,827 | A | | 6/1980 | Starkey |
| 4,513,527 | A | * | 4/1985 | Wicklund ............. A01M 23/34 124/31 |
| 2005/0284015 | A1 | | 12/2005 | Greisman |
| 2010/0031555 | A1 | | 2/2010 | Le Laidier et al. |
| 2013/0263495 | A1 | | 10/2013 | Meissner |
| 2014/0190068 | A1 | | 7/2014 | Walsh et al. |
| 2017/0000104 | A1 | | 1/2017 | Meissner |

FOREIGN PATENT DOCUMENTS

| | | | | |
|---|---|---|---|---|
| FR | 2856890 A1 | * | 1/2005 | ............ A01M 23/36 |
| WO | WO 01/06850 | * | 2/2001 | ............ A01M 23/22 |

* cited by examiner

*Primary Examiner* — Brian M O'Hara
(74) *Attorney, Agent, or Firm* — Mintz Levin Cohn Ferris Glovsky and Popeo, P.C.

(57) ABSTRACT

An animal trap includes an outer member, an inner member, a resilient member, a bottom portion, and a trigger. The outer member has a first lower end and a first upper end, and defines a first cavity. The inner member has a second lower end and a second upper end, and defines a second cavity. At least a portion of the inner member is positioned within the first cavity of the outer member. The inner member is slidably repositionable relative to the outer member between a cocked position and a deployed position. The resilient member is positioned to bias the inner member into the deployed position. The bottom portion is coupled to the first lower end of the outer member. At least one of the bottom portion and the first lower end of the outer member define a passage. The trigger assembly is positioned to selectively hold the inner member in the cocked position.

18 Claims, 20 Drawing Sheets

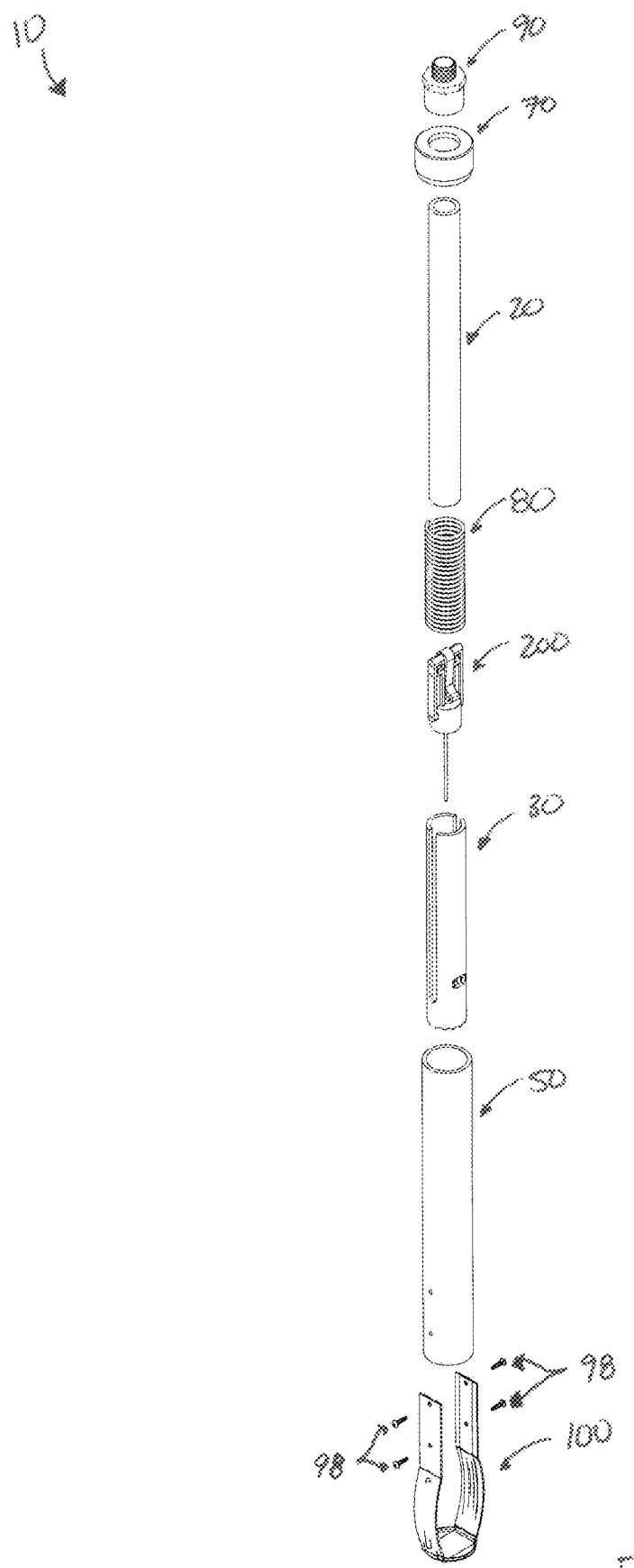

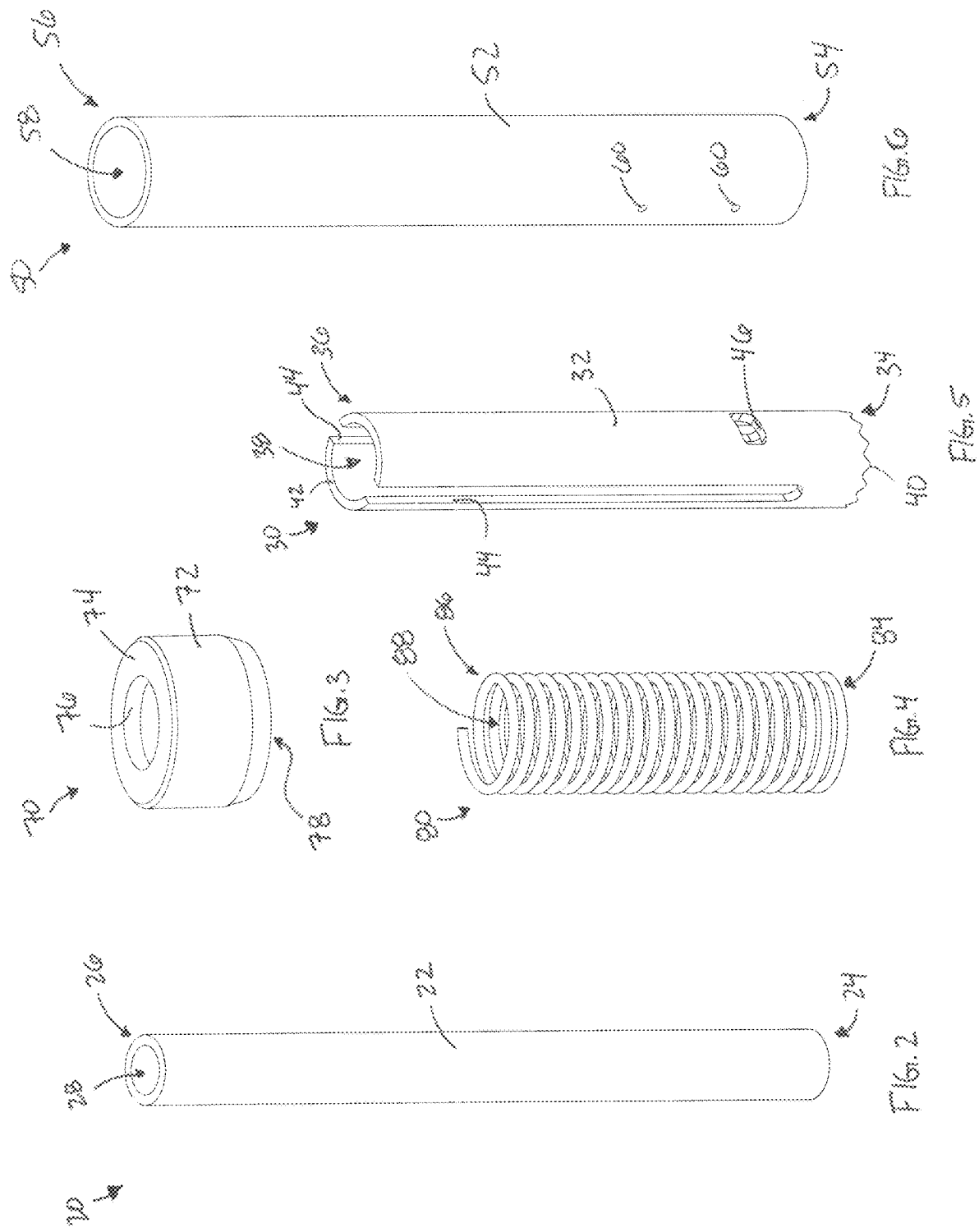

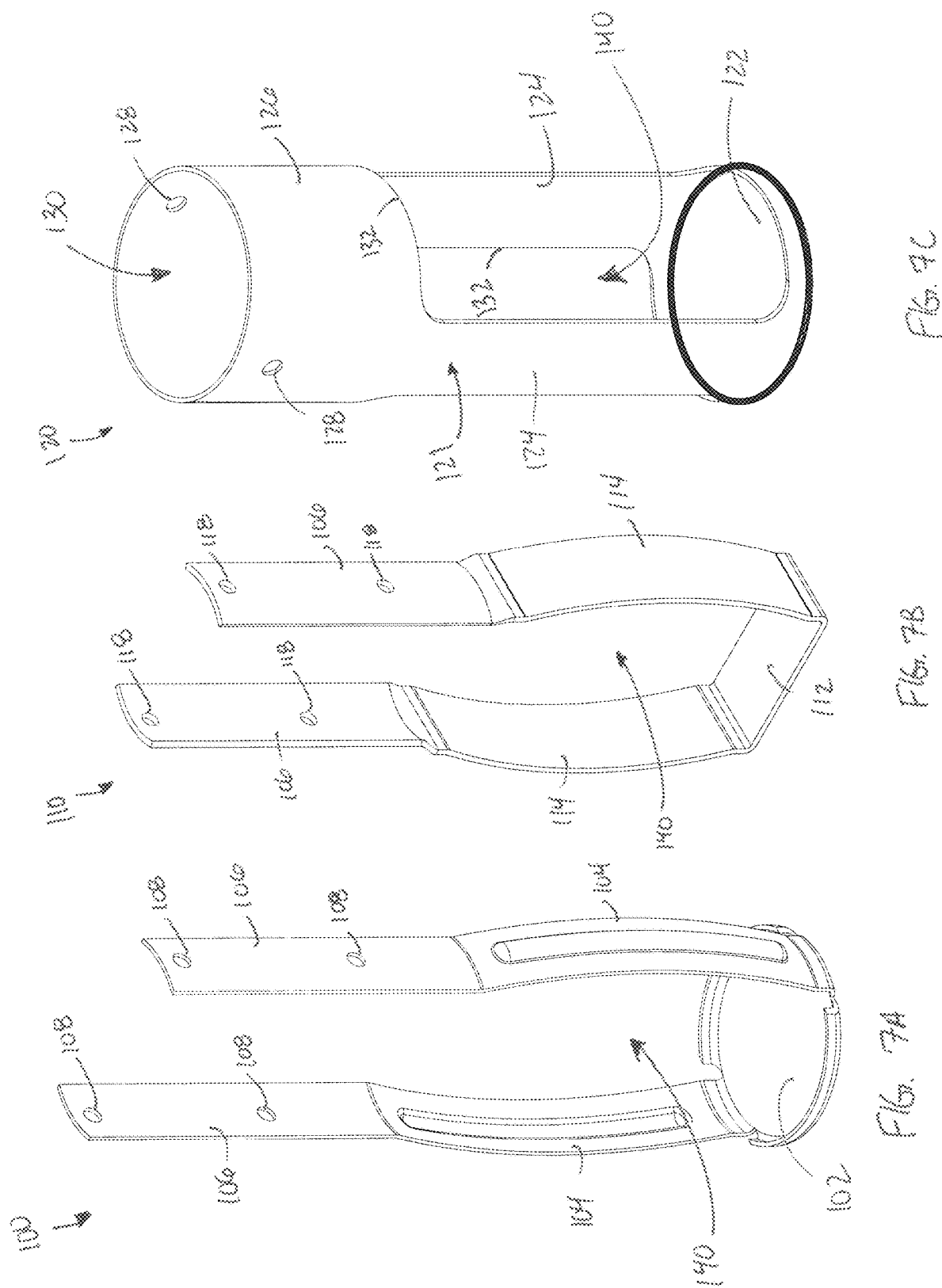

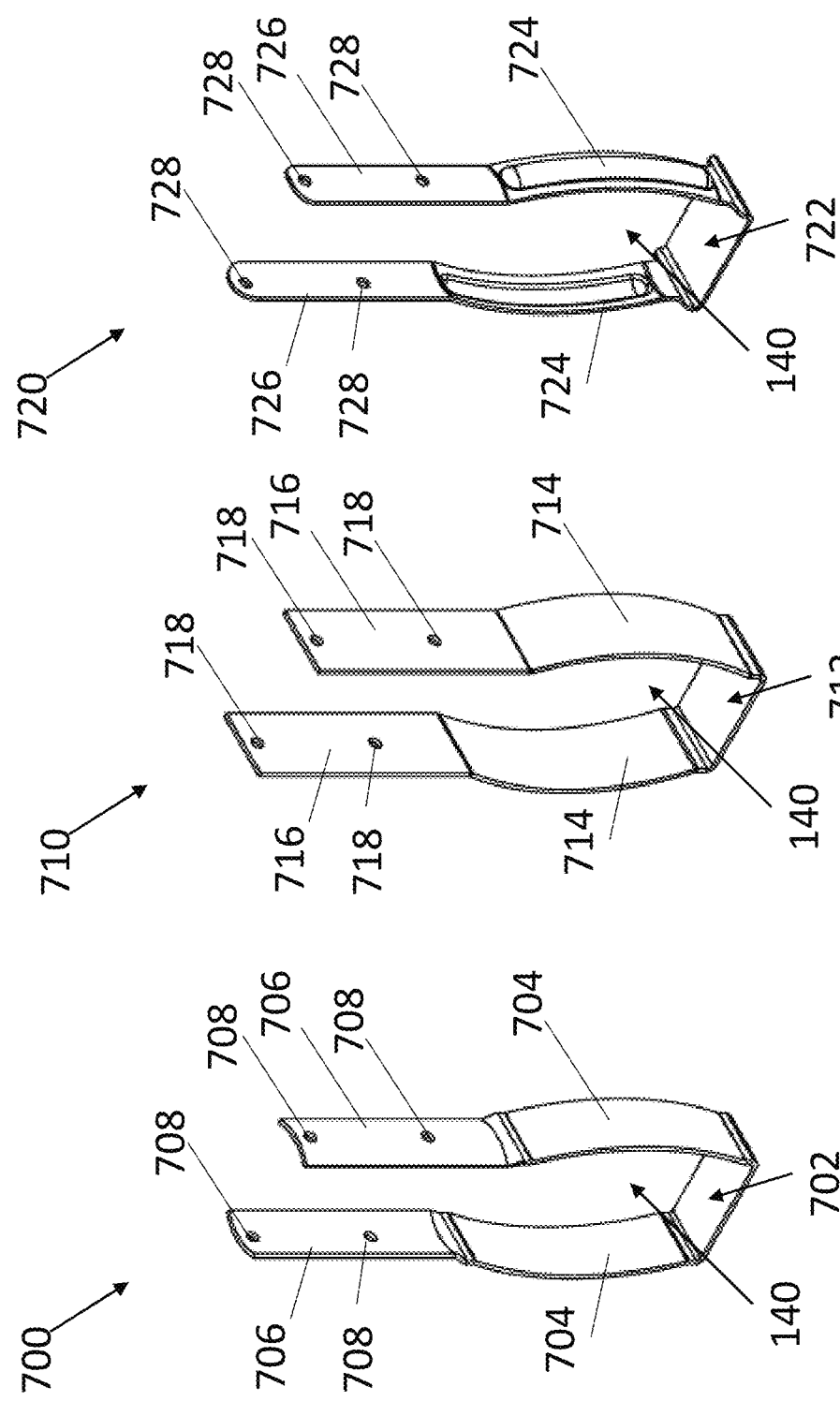

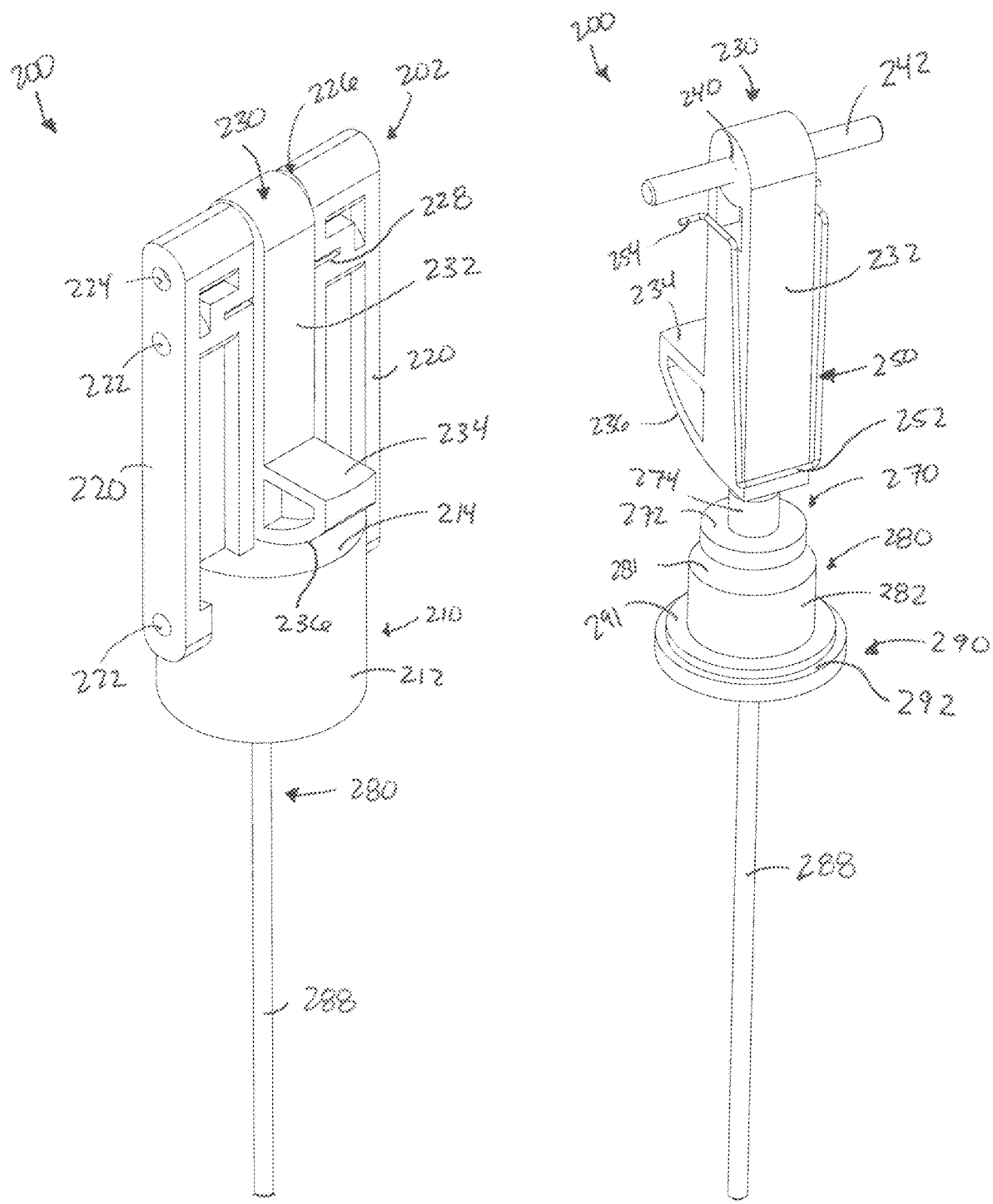

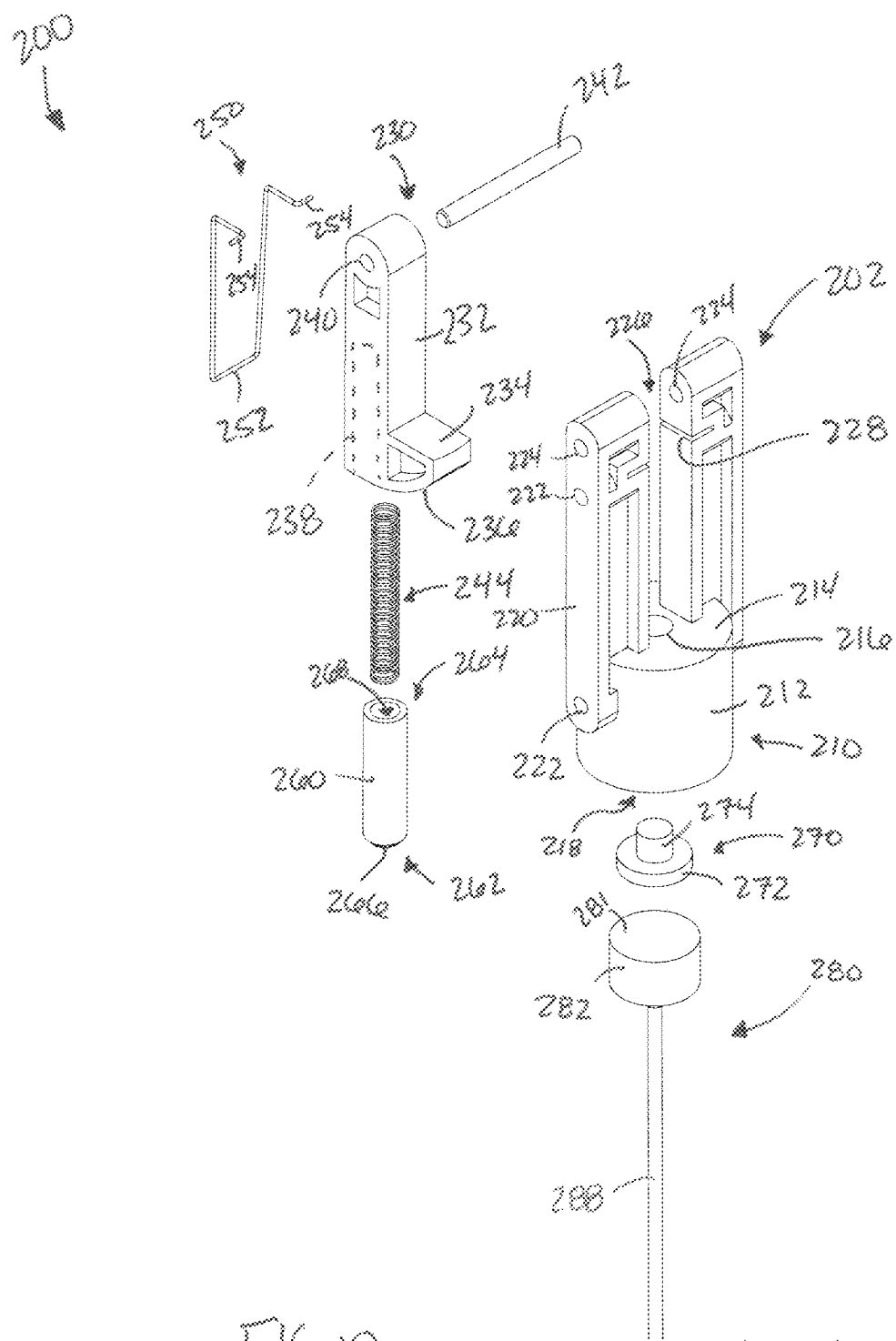
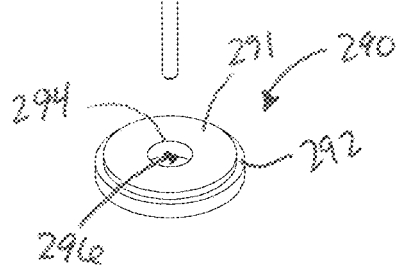
FIG. 10

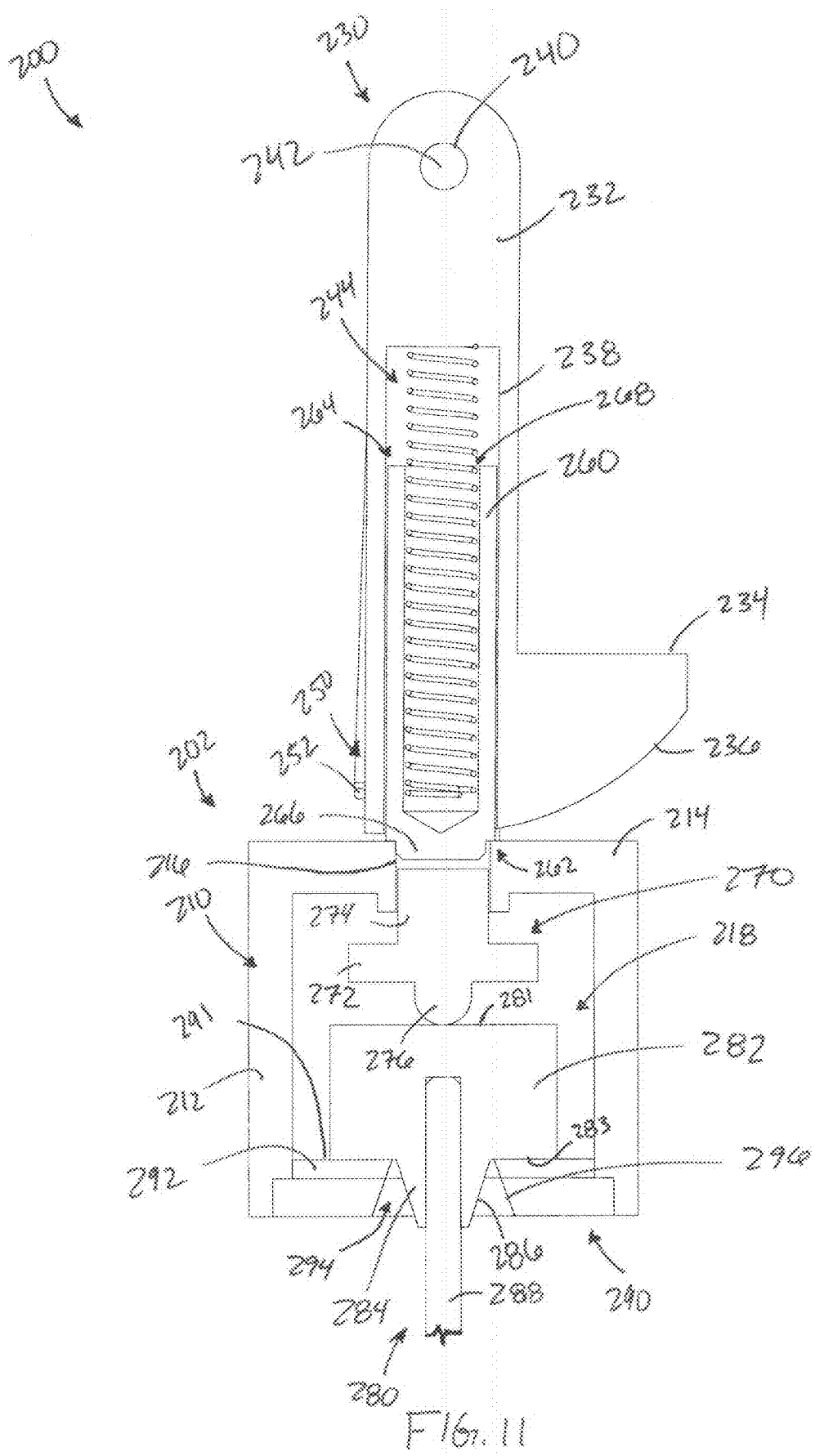

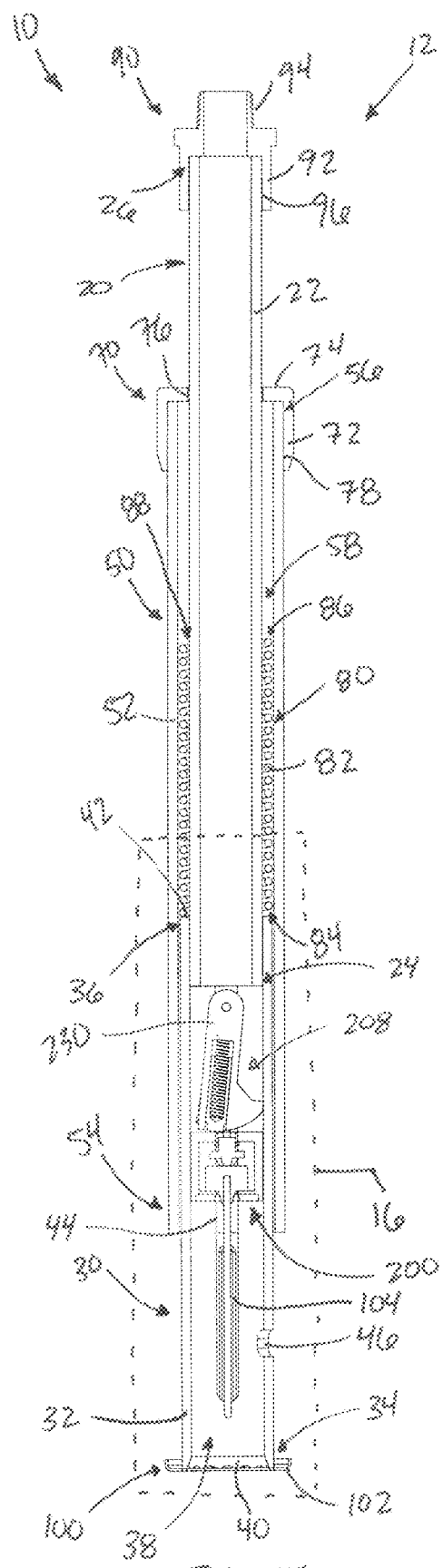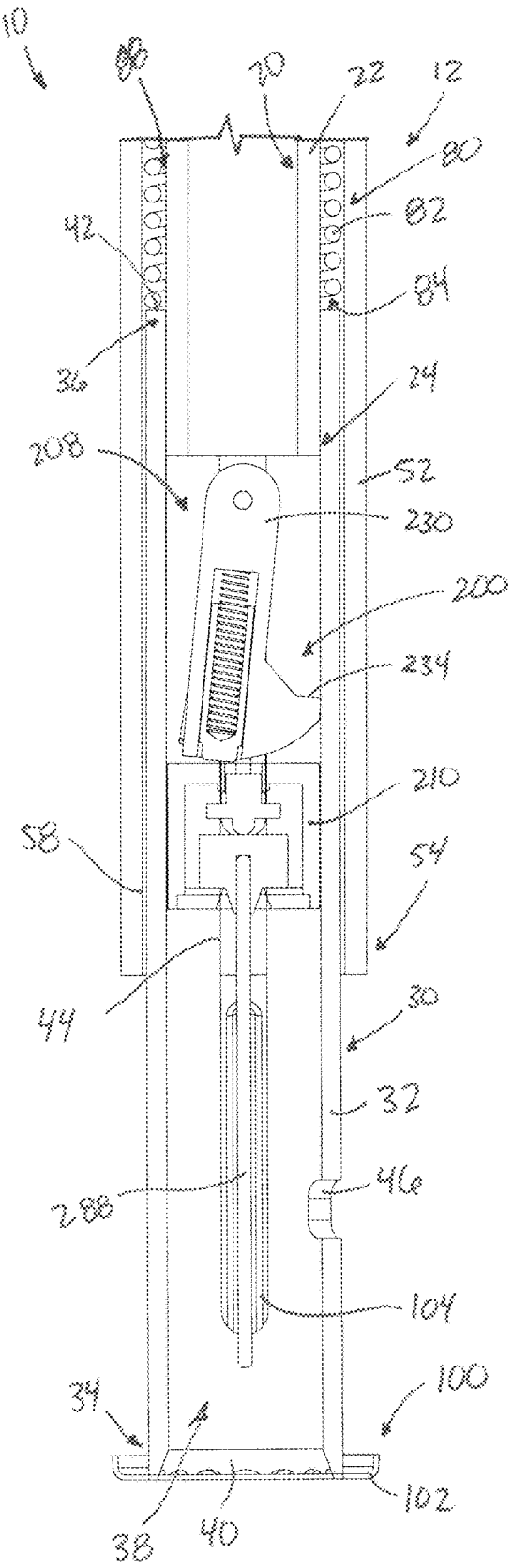
FIG. 15
FIG. 16

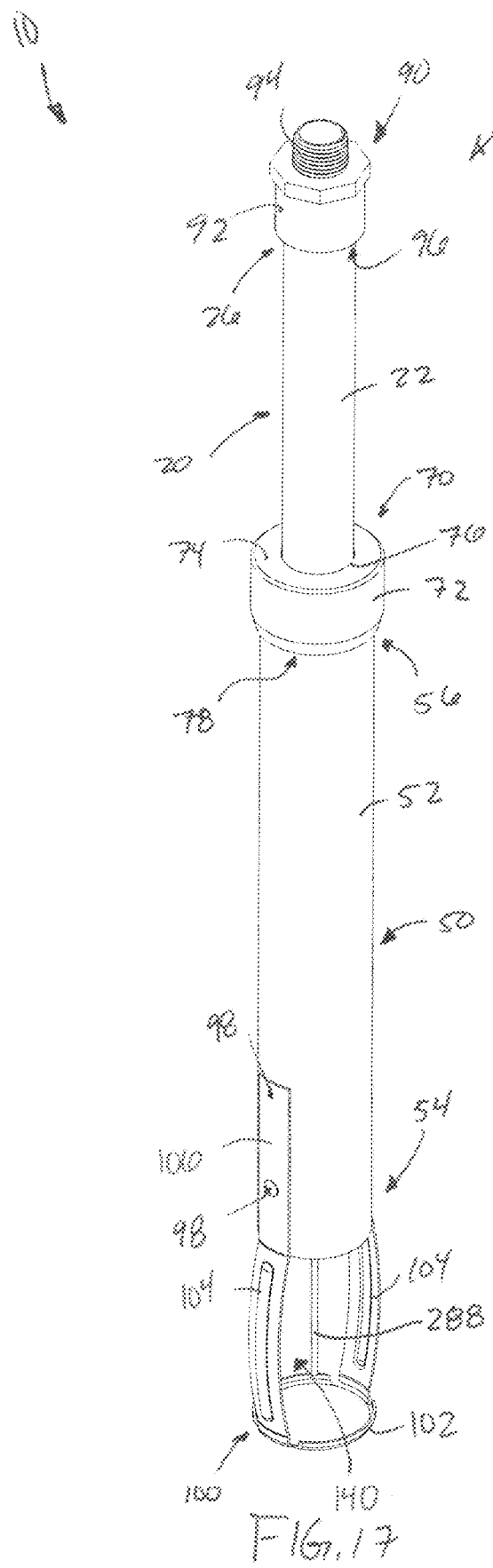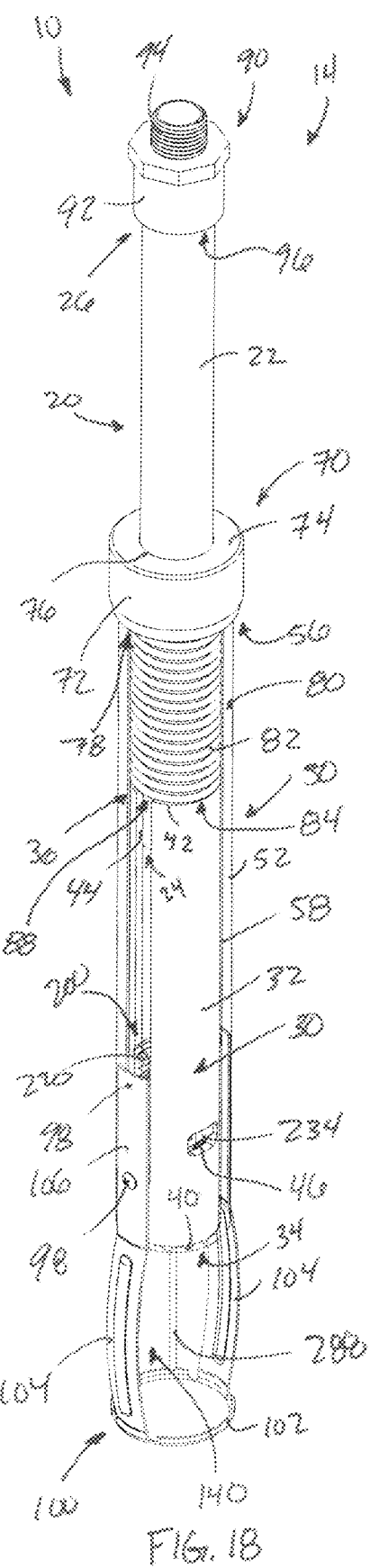

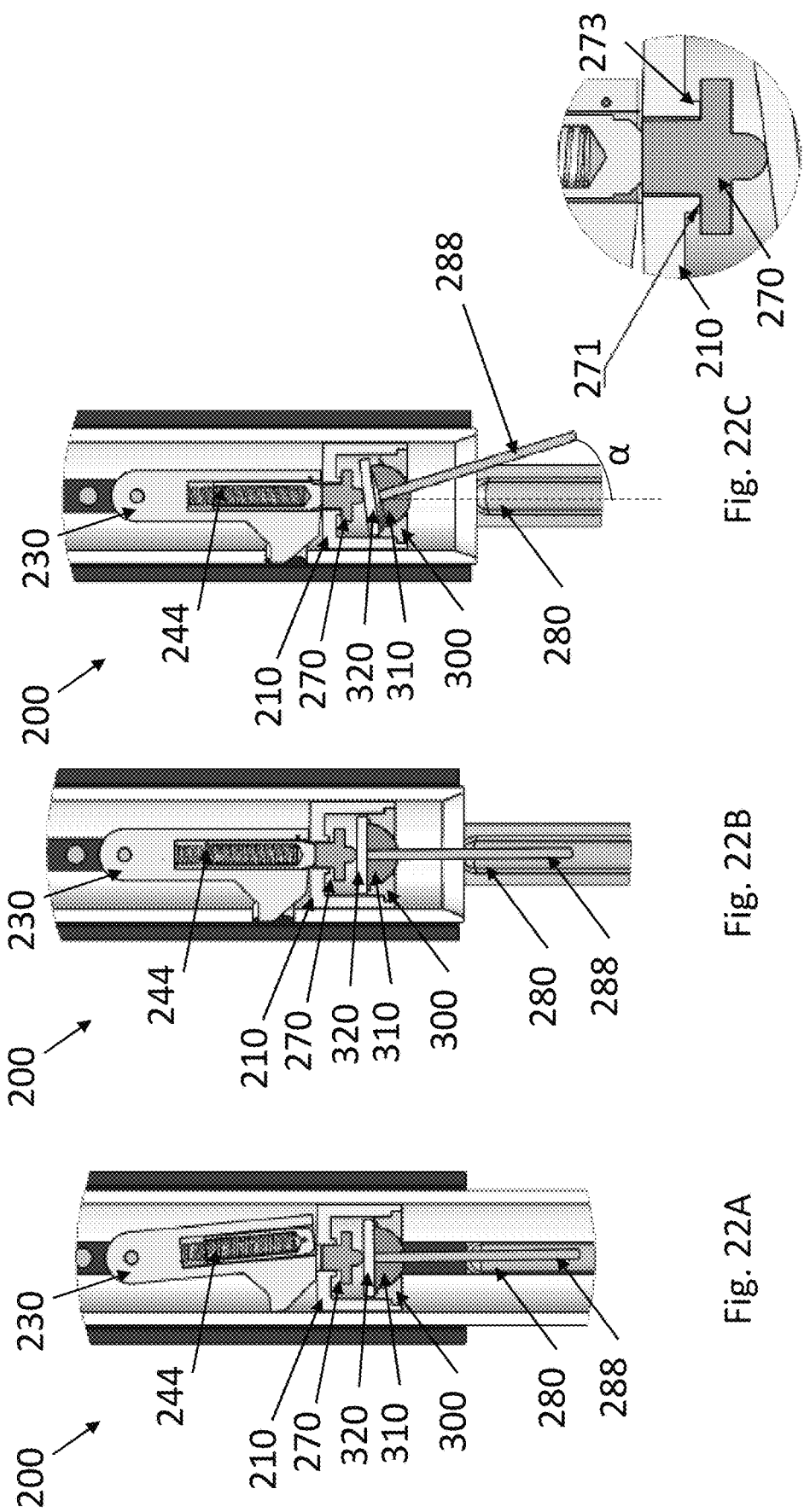

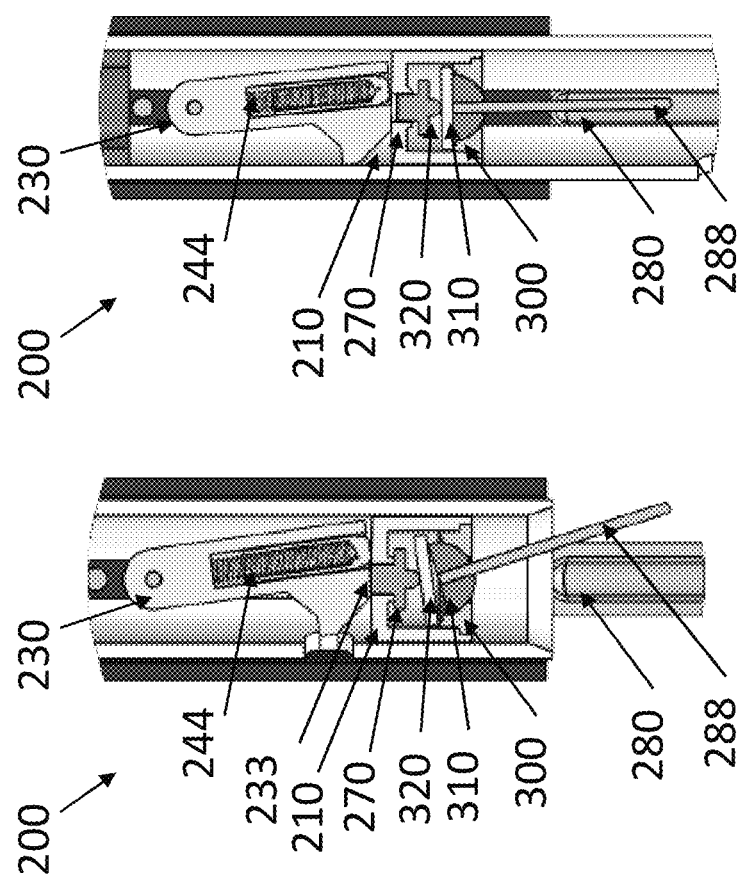

ANIMAL TRAP

CROSS REFERENCE TO RELATED APPLICATIONS

The current application claims priority to U.S. Provisional Application No. 62/445,647, filed on Jan. 20, 2017, which is incorporated by reference herein in its entirety.

BACKGROUND

Subterranean animal traps may be used to trap and/or kill an animal underground. Such subterranean animal traps may thereby be inserted into an underground tunnel created by an animal to trap and/or kill the animal.

SUMMARY

One embodiment relates to an animal trap. The animal trap includes an outer tubular member, an inner tubular member, a resilient member, a bottom portion, and a trigger. The outer tubular member has a first lower end and a first upper end, and defines a first cavity. The inner tubular member has a second lower end and a second upper end, and defines a second cavity. At least a portion of the inner tubular member is positioned within the first cavity of the outer tubular member. The inner tubular member is slidably repositionable relative to the outer tubular member between a cocked position and a deployed position. The resilient member is positioned to bias the inner tubular member into the deployed position. The bottom portion is coupled to the first lower end of the outer tubular member. At least one of the bottom portion and the first lower end of the outer tubular member define a passage. The trigger assembly is positioned to selectively hold the inner tubular member in the cocked position. The trigger assembly includes a trigger extending into the passage.

Another embodiment relates to an animal trap. The animal trap includes a first portion, a second portion coupled to the first portion, a third portion coupled to an end of the first portion, a trigger assembly, and a biasing member disposed internally within the first portion. The second portion is slidably repositionable relative to the first portion between a first position and a second position. The third portion includes a plate spaced from the end of the first portion. The trigger assembly is positioned to selectively hold the second portion in the first position such that an end of the second portion is spaced from the plate. The trigger assembly includes a trigger. The biasing member is positioned to force the second portion into the second position from the first position such that the end of the second portion engages with the plate in response to activation of the trigger.

Still another embodiment relates to an animal trap. The animal trap includes a housing, a snare tube, a snare cup, a trigger assembly, and a biasing member. The housing defines a first cavity. The snare tube defines a second cavity, a retention aperture, and a pair of slots extending longitudinally along a portion of a length of the snare tube. The snare tube is positioned within the first cavity of the housing. The snare tube is repositionable between a cocked position and a deployed position. The snare cup is coupled to an end of the housing. The snare cup defines a passage. The trigger assembly is disposed within the second cavity of the snare tube. The trigger assembly includes a trigger housing, a latch, and a trigger. The trigger housing has (i) a trigger casing defining a trigger cavity and (ii) a pair of supports extending from the trigger casing. The pair of supports are positioned to protrude through the pair of slots of the snare tube and couple the trigger housing to the housing. The latch is pivotally coupled to the pair of supports and biased to engage with the retention aperture of the snare tube to hold the snare tube in the cocked position. The trigger is disposed within the trigger cavity of the trigger casing and has a trigger rod extending from the trigger cavity into the passage. Engagement of the trigger rod causes the trigger to disengage the latch from the retention aperture, thereby releasing the snare tube from the cocked position. The biasing member is positioned to force the snare tube into the deployed position such that the snare tube projects into the passage in response to the latch disengaging from the retention aperture.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The drawings are provided to illustrate example embodiments described herein and are not intended to limit the scope of the disclosure. Throughout the drawings, reference numbers may be re-used to indicate general correspondence between referenced elements.

FIG. 1 is a perspective exploded view of an animal trap, according to an exemplary embodiment;

FIG. 2 is a perspective view of a pull tube of the animal trap of FIG. 1, according to an exemplary embodiment;

FIG. 3 is a perspective view of a spring cap of the animal trap of FIG. 1, according to an exemplary embodiment;

FIG. 4 is a perspective view of a main spring of the animal trap of FIG. 1, according to an exemplary embodiment;

FIG. 5 is a perspective view of a snare tube of the animal trap of FIG. 1, according to an exemplary embodiment;

FIG. 6 is a perspective view of a housing of the animal trap of FIG. 1, according to an exemplary embodiment;

FIGS. 7A-7F are various perspective views of a snare cup of the animal trap of FIG. 1, according to various exemplary embodiments;

FIG. 8 is a perspective view of a trigger assembly of the animal trap of FIG. 1, according to an exemplary embodiment;

FIG. 9 is an internal perspective view of the trigger assembly of FIG. 8, according to an exemplary embodiment;

FIG. 10 is an exploded perspective view of the trigger assembly of FIG. 8, according to an exemplary embodiment;

FIG. 11 is a detailed cross-sectional view of the trigger assembly of FIG. 8, according to an exemplary embodiment;

FIGS. 13-16 are various views of the animal trap of FIG. 1 in a first configuration, according to an exemplary embodiment;

FIGS. 17-22 are various views of the animal trap of FIG. 1 in a second configuration, according to an exemplary embodiment;

FIGS. 22A-22F are various views of the animal trap of FIG. 23A in various configurations, according to an exemplary embodiment;

DETAILED DESCRIPTION

Figure 12A:
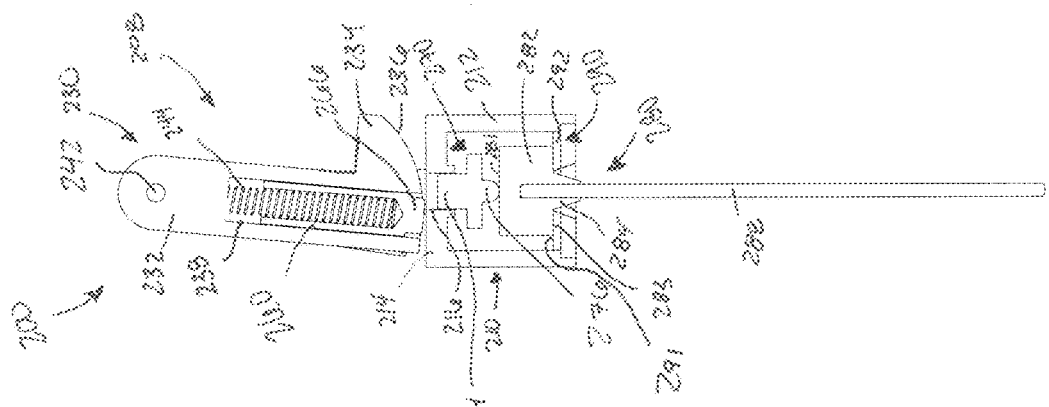
FIG. 12A is a cross-sectional view of the trigger assembly of FIG. 8 in a first configuration, according to an exemplary embodiment.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is defined by the claims that follow this description and not by any particular embodiment described herein. Before turning to the figures, which illustrate example embodiments in detail, it should be understood that the application is not limited to the details or methodology set forth in the description or illustrated in the figures. It should also be understood that the terminology is for the purpose of description only and should not be regarded as limiting.

According to an exemplary embodiment, an animal trap (e.g., a rodent trap, a gopher trap, a subterranean animal trap, etc.) is configured to be at least partially inserted into the ground to capture an animal underground. The animal trap is selectively reconfigurable between a deployed configuration and a cocked configuration. The animal trap includes a first portion (e.g., an outer portion, a first tubular member, a housing, etc.), a second portion (e.g., an inner portion, a second tubular member, a snare tube and/or a pull tube, etc.) that is slidably received within the first portion, a trigger assembly, a biasing member, and a bottom portion (e.g., a cup, a u-shaped structure, etc.). The second portion may be pulled to compress the biasing member and reconfigure the animal trap from the deployed configuration into the cocked configuration such that a lower end of the second portion is retracted from a passage of the bottom portion, exposing a trigger of the trigger assembly. The trigger assembly is configured to hold the second portion in the cocked configuration until the trigger is engaged. Engagement of the trigger may thereby cause the trigger assembly to release the second portion such that the biasing member forces the second portion into the bottom portion, enclosing the passage of the bottom portion. The second portion may thereby function as a projectile object that traps (e.g., sandwiches, holds, constrains, cinches, clamps, compresses, etc.) an animal between the bottom portion and the lower end thereof.

According to the exemplary embodiment shown in FIGS. 1-22, an animal trap (e.g., a rodent trap; a gopher trap; an at least partially subterranean, mechanical animal trap; etc.), shown as trap 10, is configured to facilitate capturing an animal (e.g., a gopher, a vole, etc.) within an underground tunnel. As shown in FIGS. 13-16 and FIGS. 17-22, the trap 10 is selectively reconfigurable between a first configuration, shown as deployed configuration 12, and a second configuration, shown as cocked configuration 14, respectively. By way of example, the trap 10 may be inserted into an underground tunnel in the cocked configuration 14 to attempt to capture an animal as it travels along the underground tunnel. The trap 10 may be configured to reconfigure into the deployed configuration 12, thereby trapping the animal, in response to the animal encountering the trap 10 (e.g., activating a trigger mechanism thereof, etc.). As shown in FIGS. 1-22, the trap 10 includes a first portion, shown as pull tube 20; a second portion (e.g., an inner portion, an inner tube, etc.), shown as snare tube 30; a third portion (e.g., an outer portion, an outer tube, etc.), shown as housing 50; a cap, shown as spring cap 70, a biasing member, shown as main spring 80; a top portion, shown as handle coupler 90; a plurality of fasteners, shown as fasteners 98; a bottom portion, shown as snare cup 100; and a trigger mechanism, shown as trigger assembly 200.

As shown in FIGS. 2,13-19, and 21, the pull tube 20 includes a sidewall, shown as pull tube sidewall 22. The pull tube sidewall 22 has a first end, shown as lower end 24, and an opposing second end, shown as upper end 26. As shown in FIGS. 5,13-16, 18-22, the snare tube 30 includes a sidewall, shown as snare tube sidewall 32. The snare tube sidewall 32 has a first end, shown as lower end 34, and an opposing second end, shown as upper end 36. As shown in FIGS. 5,15,16, and 19-22, the snare tube sidewall 32 defines an interior cavity, shown as snare tube cavity 38. As shown in FIGS. 14-16, 18, 19, and 21, the upper end 36 of the snare tube 30 receives the lower end 24 of the pull tube 20 such that at least a portion of the pull tube 20 is disposed within the snare tube cavity 38. In one embodiment, the pull tube 20 is fixedly coupled to the snare tube 30 (e.g., with adhesive, welded, etc.). In another embodiment, the pull tube 20 is releasably coupled to the snare tube 30 (e.g., via a threaded engagement, a snap fit, an interference fit, etc.). In an alternative embodiment, the pull tube 20 and the snare tube 30 are integrally formed (e.g., a unitary component, etc.).

As shown in FIGS. 5, 16, and 19-22, the lower end 34 of the snare tube sidewall 32 defines an edge, shown as serrated edge 40. In other embodiments, the lower end 34 of the snare tube sidewall 32 does not define the serrated edge 40. By way of example, the lower end 34 of the snare tube sidewall 32 may form a pointed edge (e.g., a cone shape, etc.). As shown in FIGS. 5, 14-16, 18, 19, and 21, the upper end 36 of the snare tube sidewall 32 defines an edge, shown as spring ledge 42. As shown in FIGS. 5, 14-16, 18, 21, and 22, the snare tube sidewall 32 defines a pair of slots, shown as trigger slots 44, positioned on opposing sides of the snare tube 30 and extending from the upper end 36 along at least a portion of the longitudinal length of the snare tube 30 (e.g., 50%, 60%, 75%, 90%, 95%, etc. of the longitudinal length of the snare tube 30, etc.). As shown in FIGS. 5, 13-16, 18, 21, and 22, the snare tube sidewall 32 defines a retention feature, shown as retention aperture 46, positioned proximate the lower end 34 of the snare tube 30.

Figure 19:
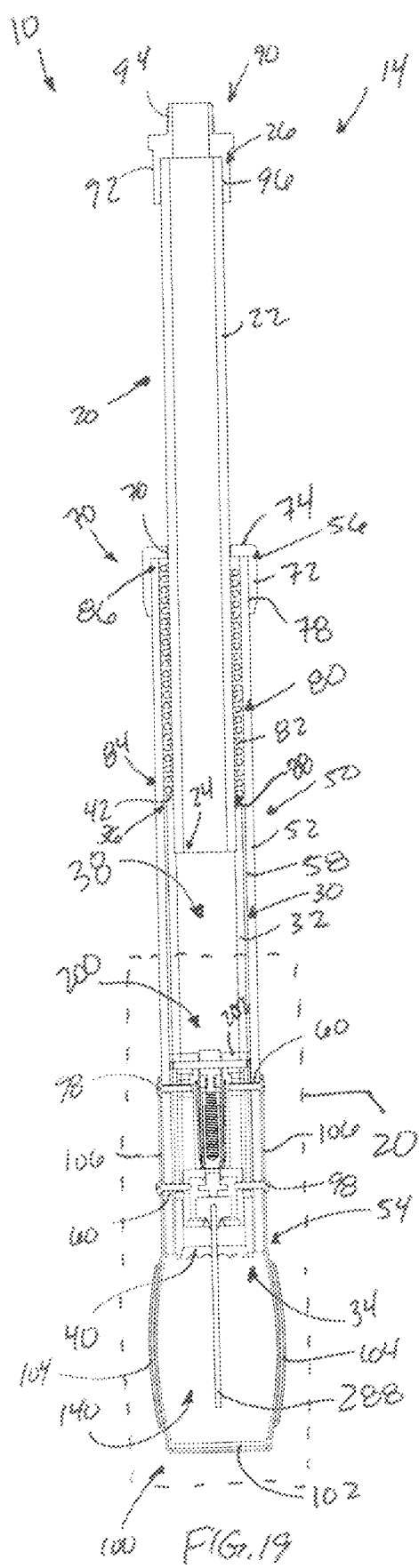
Figure 20:
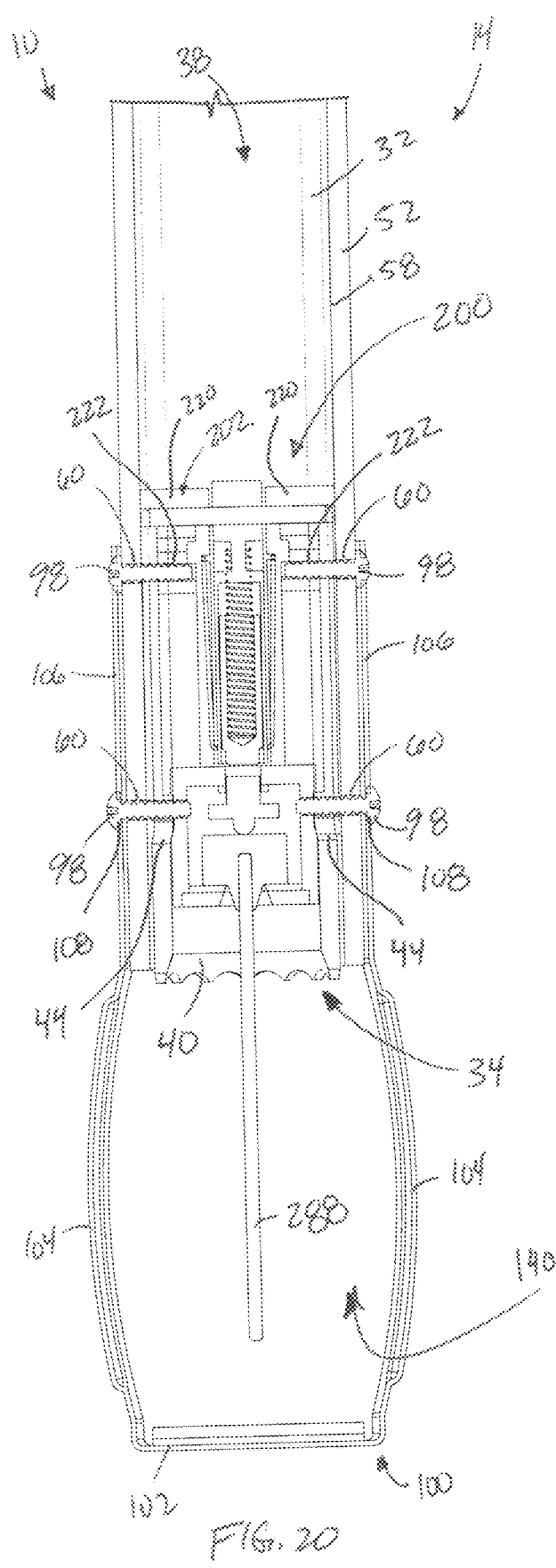

As shown in FIGS. 6 and 13-22, the housing 50 includes a sidewall, shown as housing sidewall 52. The housing sidewall 52 has a first end, shown as lower end 54, and an opposing second end, shown as upper end 56. As shown in FIGS. 6, 14-16, 18-22, the housing sidewall 52 defines an interior cavity, shown as housing cavity 58. As shown in FIGS. 6, 19, and 20, the housing sidewall 52 defines a plurality of apertures, shown as coupling apertures 60, positioned on opposing sides of the housing 50 and proximate the lower end 54 thereof. As shown in FIGS. 14-16 and 18-22, the pull tube 20 and the snare tube 30 are disposed within the housing cavity 58. According to an exemplary embodiment, the pull tube 20 and the snare tube 30 are linearly translatable within (e.g., slidably coupled to, etc.) the housing cavity 58 (e.g., between the deployed configuration 12 and the cocked configuration 14, etc.). According to an exemplary embodiment, the pull tube sidewall 22, the snare tube sidewall 32, and the housing sidewall 52 have circular cross-sectional shapes. In other embodiments, the pull tube sidewall 22, the snare tube sidewall 32, and/or the housing sidewall 52 are otherwise shaped (e.g., square, hexagonal, octagonal, ovular, triangular, etc.).

Figure 24:
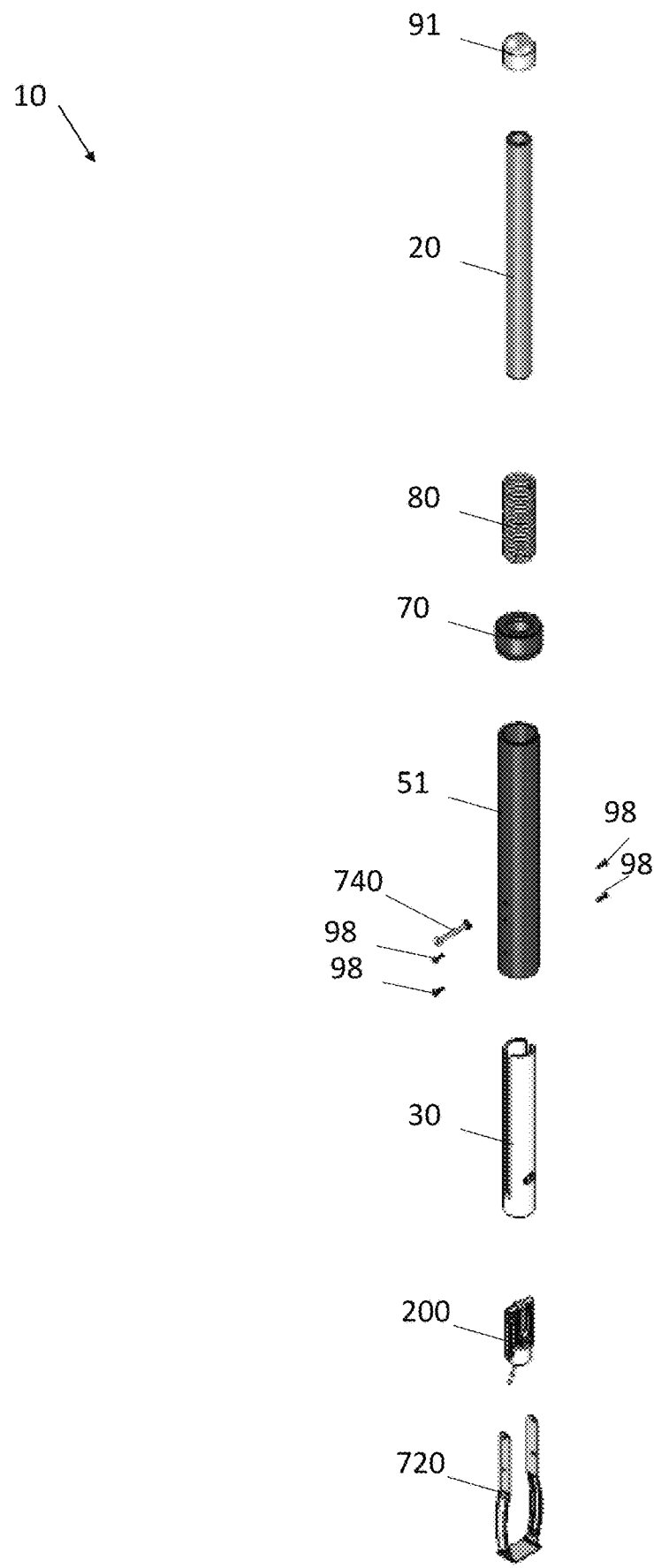
FIG. 24 is a perspective exploded view of an animal trap, according to an exemplary embodiment.
Figure 26:
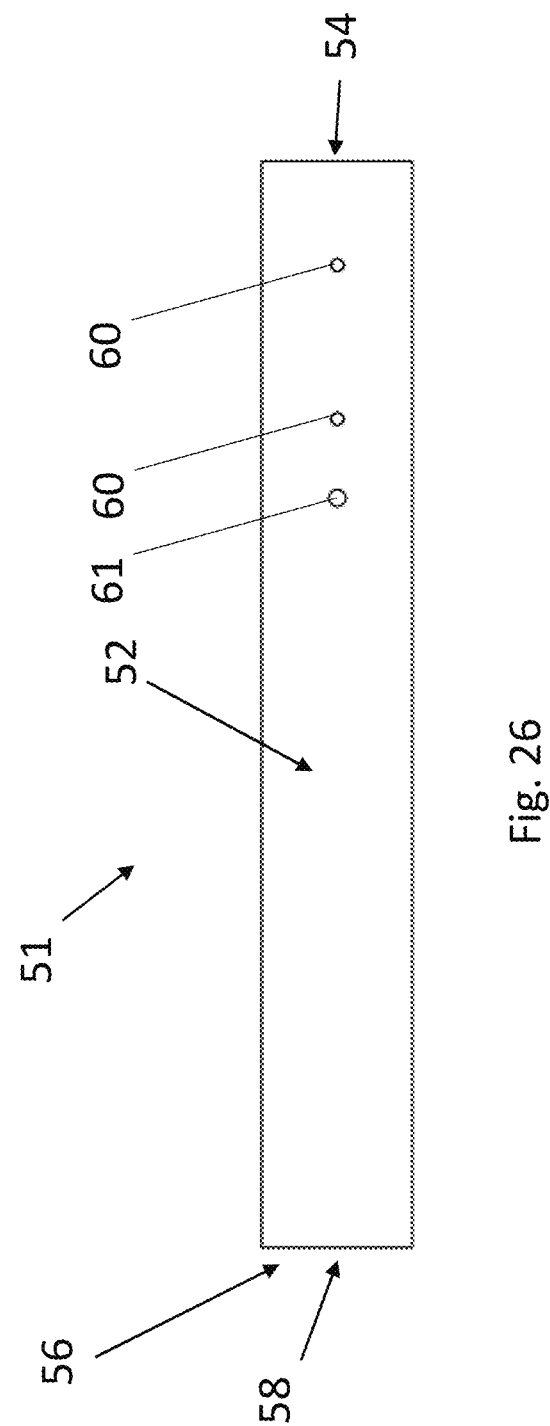
FIG. 26 is a side view of a housing of the animal trap of FIG. 24, according to an exemplary embodiment.

FIG. 26 illustrates a side view of an embodiment of a housing 51. FIG. 24 illustrates an exploded view of another example of the trap 10. As shown in FIG. 24, the trap 10 includes a first portion, shown as the pull tube 20; a second portion (e.g., an inner portion, an inner tube, etc.), shown as the snare tube 30; a third portion (e.g., an outer portion, an outer tube, etc.), shown as the housing 51; a cap, shown as the spring cap 70, a biasing member, shown as the main spring 80; a top portion, shown as the cap 91; a plurality of fasteners, shown as the fasteners 98; a bottom portion, shown as the snare cup 720; and a trigger mechanism, shown as the trigger assembly 200.

As shown in FIGS. 24 and 26, the housing 51 includes many of the same or similar features as the housing 50. For example, the housing 51 includes a sidewall, shown as housing sidewall 52. The housing sidewall 52 has a first end, shown as lower end 54, and an opposing second end, shown as upper end 56. The housing sidewall 52 defines an interior cavity, shown as housing cavity 58. The housing sidewall 52 defines a plurality of apertures, shown as coupling apertures 60, positioned on opposing sides of the housing 50 and proximate the lower end 54 thereof. As shown in FIGS. 24 and 26, the housing 51 can include at least one stop pin aperture 61. The stop pin aperture 61 can be configured to receive a stop pin 740. In some embodiments, the housing 51 can include a stop pin aperture 61 positioned on opposing sides of the housing 51. The stop pin aperture 61 can be positioned above the coupling apertures 60. The stop pin 740 (shown in at least FIG. 24) can limit movement, of certain components within the housing 51 such as rotational movement, lateral movement, and/or translational movement along a longitudinal axis of the trap 10. In some embodiments, the stop pin 740 can prevent translational movement of one or more components positioned above the stop pin 740 in the trap 10, such as the spring 80, among others.

As shown in FIGS. 3, 13-15, 17-19, and 21, the spring cap 70 has a plate, shown as plate 74, and a peripheral wall, shown as sidewall 72, extending around the periphery of the plate 74. The plate 74 defines an aperture, shown as pull tube aperture 76. The plate 74 and the sidewall 72 cooperatively define an internal cavity, shown as cavity 78. As shown in FIGS. 13-15, 17-19, and 21, the spring cap 70 is positioned to enclose the upper end 56 of the housing cavity 58 of the housing 50 such that (i) the upper end 26 of the pull tube 20 extends through pull tube aperture 76 and (ii) the upper end 56 of the housing 50 is received within the cavity 78 (i.e., the sidewall 72 of the spring cap 70 extends around the periphery of upper end 56 of the housing sidewall 52) and engages with (e.g., interfaces with, abuts, etc.) the inner surface of the plate 74. In one embodiment, the spring cap 70 is fixedly coupled to the housing 50 (e.g., with adhesive, welded, etc.). In another embodiment, the spring cap 70 is releasably coupled to the housing 50 (e.g., via a threaded engagement, a snap fit, an interference fit, etc.). In an alternative embodiment, the spring cap 70 and the housing 50 are integrally formed (e.g., a unitary component, etc.).

As shown in FIGS. 4, 14-16, 18, 19, and 21, the main spring 80 includes a resilient member, shown as linear coil 82, having a first end, shown as lower end 84, and an opposing second end, shown as upper end 86. The linear coil 82 has a coil arrangement that defines a through-hole, shown as central aperture 88. As shown in FIGS. 14-16, 18, 19, and 21, the main spring 80 is disposed within the housing cavity 58 between the spring ledge 42 of the upper end 36 of the snare tube 30 and the plate 74 of the spring cap 70 such that the pull tube 20 extends though the central aperture 88 of the linear coil 82 (i.e., the linear coil 82 is disposed around the pull tube sidewall 22).

Figure 25:
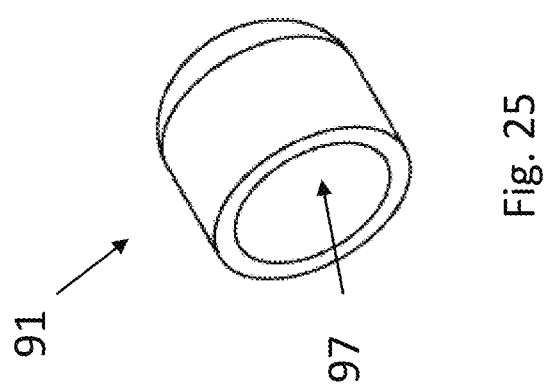
FIG. 25 is a perspective view of a cap of the animal trap of FIG. 24, according to an exemplary embodiment.

As shown in FIGS. 13-15, 17-19, and 21, the handle coupler 90 has a body, shown as body 92, with a coupler, shown as coupler 94, extending therefrom. The body 92 defines a cavity, shown cavity 96. The handle coupler 90 is positioned such that the upper end 26 of the pull tube 20 is received within the cavity 96. According to an exemplary embodiment, the coupler 94 of the handle coupler 90 is configured to facilitate coupling (e.g., releasably coupling, threadingly coupling, etc.) a handle to the pull tube 20 such that an operator may pull on the handle to reconfigure the trap 10 from the deployed configuration 12 to the cocked configuration 14. In another embodiment, the handle is integrally formed with the handle coupler 90. In one embodiment, the handle coupler 90 is fixedly coupled to the pull tube 20 (e.g., with adhesive, welded, etc.). In another embodiment, the handle coupler 90 is releasably coupled to the pull tube 20 (e.g., via a threaded engagement, a snap fit, an interference fit, etc.). In an alternative embodiment, the handle coupler 90 and the pull tube 20 are integrally formed (e.g., a unitary component, etc.). In another embodiment, as shown in FIGS. 24 and 25, the handle coupler 90 can be replaced by or used with a cap 91. The cap 91 can define a cavity 97. The cap 91 can be positioned such that the upper end 26 of the pull tube 20 is received within the cavity 97. The cap 91 can help to limit movement of certain components of the trap 10. The cap 97 can help to prevent certain components from sliding out of the pull tube 20.

As shown in FIGS. 7A and 13-22, the snare cup 100 includes a plate, shown as bottom plate 102, a plurality of arms (e.g., two, three, four, etc.), shown as arms 104, and a plurality of flanges (e.g., two, three, four, etc.), shown as flanges 106. According to the exemplary embodiment shown in FIGS. 7A, 13, 14, and 17-20, the snare cup 100 includes a pair of arms 104 and a pair of flanges 106 disposed on opposing sides of the bottom plate 102. The snare cup 100 may thereby have a U-shaped structure. In another embodiment, the snare cup 100 includes a different number of arms 104 and flanges 106 (e.g., three, four, etc.).

As shown in FIGS. 7A and 20, the flanges 106 define a plurality of apertures, shown as coupling apertures 108. As shown in FIG. 20, the coupling apertures 108 of the snare cup 100 are positioned to align with the coupling apertures 60 of the housing 50. As shown in FIGS. 13, 14, and 17-20, the coupling apertures 60 and the coupling apertures 108 receive the fasteners 98 (e.g., screws, bolts, rivets, clamps, etc.) to releasably couple the snare cup 100 to the lower end 54 of the housing 50. The snare cup 100 may thereby be replaceable and/or interchangeable. In another embodiment, the snare cup 100 is fixedly coupled to the lower end 54 of the housing (e.g., with an adhesive, welded, etc.). In an alternative embodiment, the snare cup 100 and the housing 50 are integrally formed (e.g., a unitary component, etc.). As shown in FIGS. 7A and 17-20, the arms 104 are configured to space the bottom plate 102 from the lower end 54 of the housing 50 such that a passage, shown as snare passage 140, is formed therebetween when the trap 10 is arranged in the cocked configuration 14. According to an exemplary embodiment, the snare cup 100 is manufactured using a stamping process.

As shown in FIG. 7B, a second bottom portion, shown as snare cup 110, may be used in place of the snare cup 100. The snare cup 110 includes a plate, shown as bottom plate 112, a plurality of arms (e.g., two, three, four, etc.), shown as arms 114, and a plurality of flanges (e.g., two, three, four, etc.), shown as flanges 116, that define a plurality of apertures, shown as coupling apertures 118. The bottom plate 112, the arms 114, the flanges 116, and the coupling apertures 118 of the snare cup 110 may function similar to that of the bottom plate 102, the arms 104, the flanges 106, and the coupling apertures 108 of the snare cup 100. According to an exemplary embodiment, the snare cup 110 is hand fabricated and/or manufactured from sheet metal.

As shown in FIG. 7C, a third bottom portion, shown as snare cup 120, may be used in place of the snare cup 100. The snare cup 120 has an cylindrical sidewall, shown as sidewall 121, and a plate, shown as bottom plate 122, enclosing a bottom end of the sidewall 121. The sidewall 121 has an upper portion, shown as coupling portion 126, that defines a plurality of apertures, shown as coupling apertures 128, and a through-hole, shown as housing aperture 130. According to an exemplary embodiment, the housing aperture 130 is configured (e.g., shaped, etc.) to correspond with and receive the lower end 54 of the housing 50 such that the coupling apertures 128 align with the coupling apertures 60 to facilitate coupling the snare cup 120 to the lower end 54 of the housing 50 using the fasteners 98. As shown in FIG. 7C, the sidewall 121 defines a pair of cutouts, shown as cutouts 132, the cooperatively define the snare passage 140. The remaining portion of the sidewall 121 defines a pair of arms, shown as arms 124, that couple the bottom plate 122 to the coupling portion 126 of the snare cup 120. According to an exemplary embodiment, the snare cup 120 is manufactured using a cutting and welding process (e.g., the coupling apertures 128 and the cutouts 132 are cut from of the sidewall 121 and then the bottom plate 122 is welded to the sidewall 121, etc.).

As shown in FIG. 7D, a fourth bottom portion, shown as snare cup 700, may be used in place of the snare cup 100. The snare cup 700 includes a plate, shown as bottom plate 702, a plurality of arms (e.g., two, three, four, etc.), shown as arms 704, and a plurality of flanges (e.g., two, three, four, etc.), shown as flanges 706, that define a plurality of apertures, shown as coupling apertures 708. The bottom plate 702, the arms 704, the flanges 706, and the coupling apertures 708 of the snare cup 700 may function similar to that of the bottom plate, the arms, the flanges, and the coupling apertures of the snare cups 100, 110. According to an exemplary embodiment, the snare cup 710 is hand fabricated, manufactured from sheet metal, and/or cut and welded, among other processes.

As shown in FIG. 7E, a fifth bottom portion, shown as snare cup 710, may be used in place of the snare cup 100. The snare cup 710 includes a plate, shown as bottom plate 712, a plurality of arms (e.g., two, three, four, etc.), shown as arms 714, and a plurality of flanges (e.g., two, three, four, etc.), shown as flanges 716, that define a plurality of apertures, shown as coupling apertures 718. The bottom plate 712, the arms 714, the flanges 716, and the coupling apertures 718 of the snare cup 710 may function similar to that of the bottom plate, the arms, the flanges, and the coupling apertures of the snare cups 100, 110, 700. According to an exemplary embodiment, the snare cup 710 is hand fabricated, manufactured from sheet metal, and/or cut and welded, among other processes.

As shown in FIG. 7F, a fifth bottom portion, shown as snare cup 720, may be used in place of the snare cup 100. The snare cup 720 includes a plate, shown as bottom plate 722, a plurality of arms (e.g., two, three, four, etc.), shown as arms 724, and a plurality of flanges (e.g., two, three, four, etc.), shown as flanges 726, that define a plurality of apertures, shown as coupling apertures 728. The bottom plate 722, the arms 724, the flanges 726, and the coupling apertures 728 of the snare cup 720 may function similar to that of the bottom plate, the arms, the flanges, and the coupling apertures of the snare cups 100, 110, 700, 710. According to an exemplary embodiment, the snare cup 720 is hand fabricated, manufactured from sheet metal, and/or cut and welded, among other processes.

As shown in FIGS. 8-12C, the trigger assembly 200 includes a housing, shown as trigger housing 202; a catch, shown as trigger latch 230; a coupling pin, shown as dowel pin 242; a linear biasing and/or resilient member, shown as linear spring 244; a rotational biasing and/or resilient member, shown as return spring 250; a retaining element, shown as trigger pin 260; a plug, shown as trigger plug 270; an actuation member, shown as trigger 280; and a cap, shown as trigger cap 290. As shown in FIGS. 8,10, and 11-12C, the trigger housing 202 includes a housing portion, shown as trigger casing 210, and a pair of extensions, shown as housing supports 220, poisoned at opposing sides of the trigger casing 210 and extending therefrom. The trigger casing 210 has a surface, shown as top surface 214, and a wall, shown as peripheral wall 212, extending around the periphery of the top surface 214. The top surface 214 of the trigger casing 210 defines an aperture, shown as detent aperture 216. The peripheral wall 212 and the top surface 214 cooperatively define an interior cavity, shown as trigger cavity 218, of the trigger casing 210.

As shown in FIGS. 8 and 10, the housing supports 220 define a first plurality of apertures, shown as coupling apertures 222, and a second plurality of apertures, shown as pin apertures 224. As shown in FIGS. 8 and 10, the housing supports 220 define a slot, shown as latch slot 226, disposed between the housing supports 220. The housing supports 220 each define a recess, shown as spring recess 228.

Figure 12B:
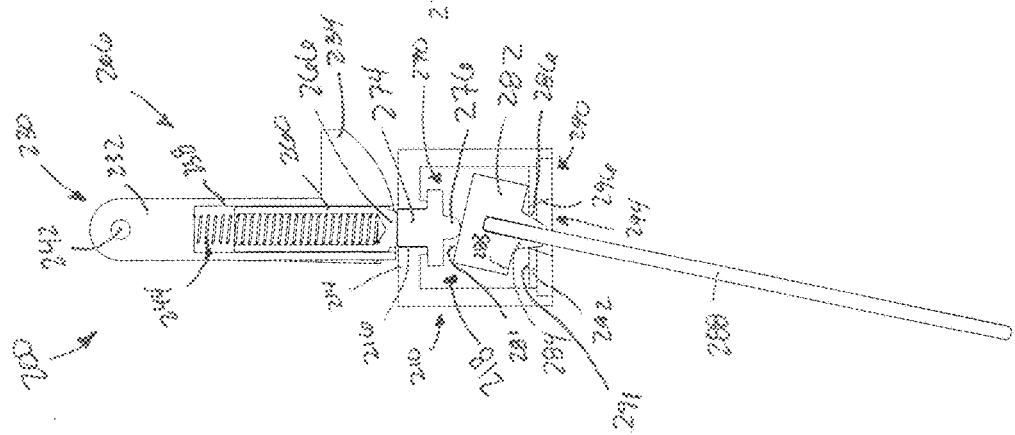
FIG. 12B is a cross-sectional view of the trigger assembly of FIG. 8 in a second configuration, according to an exemplary embodiment.
Figure 12C:
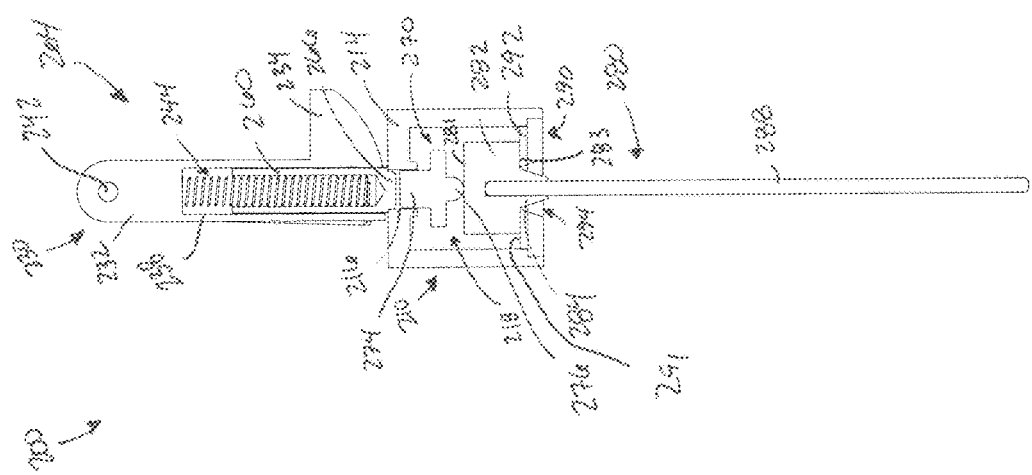
FIG. 12C is a cross-sectional view of the trigger assembly of FIG. 8 in a third configuration, according to an exemplary embodiment.
Figure 13:
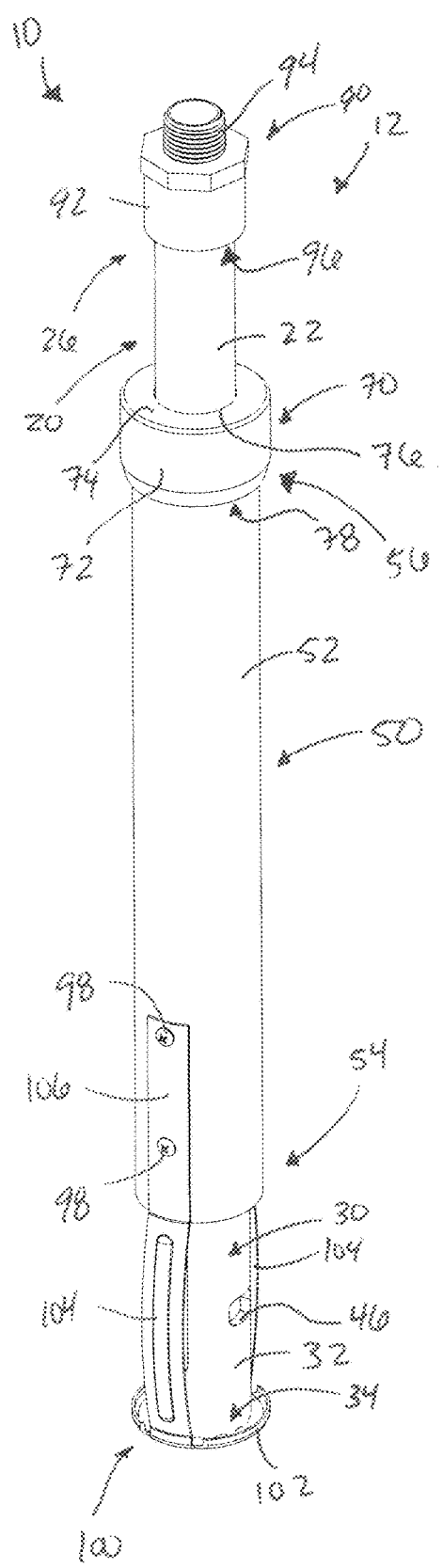

As shown in FIGS. 8-12C, the trigger latch 230 has a body, shown as longitudinal body 232, with a protrusion, shown retaining element 234, extending from a lower end of a front face thereof. The retaining element 234 has a first surface or flat upper surface and an opposing second surface, shown as curved bottom surface 236. As shown in FIGS. 10-12C, the longitudinal body 232 of the trigger latch 230 defines a recess, shown as spring cavity 238, that extends from a lower end of the longitudinal body 232 along at least a portion of the length of the longitudinal body 232. As shown in FIGS. 11-12C, the spring cavity 238 of the trigger latch 230 is configured to slidably receive the linear spring 244 and the trigger pin 260.

As shown in FIGS. 9-12C, an upper end of the longitudinal body 232 of the trigger latch 230 defines an aperture, shown as pin aperture 240. As shown in FIGS. 9 and 11-12C, the pin aperture 240 is configured to receive the dowel pin 242. According to an exemplary embodiment, the dowel pin 242 is configured to pivotally couple the trigger latch 230 to the housing supports 220 by engaging with the pin apertures 224 of the housing supports 220 such that the trigger latch 230 may pivot within the latch slot 226.

As shown in FIGS. 10 and 11, the trigger pin 260 has a first end, shown as lower end 262, and an opposing second end, shown as upper end 264. The lower end 262 defines a retaining feature, shown as detent 266. As shown in FIGS. 11 and 12A, the detent 266 is positioned to selectively engage with the detent aperture 216 of the trigger casing 210 to selectively, rotationally fix the trigger latch 230. As shown in FIGS. 10 and 11, the upper end 264 defines a cavity, shown as spring cavity 268. As shown in FIG. 11, the spring cavity 268 extends from the upper end 264 along at least a portion of the length of the trigger pin 260 and is configured to receive at least a portion of the linear spring 244. The trigger pin 260 may thereby selectively hold the linear spring 244 within the spring cavity 238 of the trigger latch 230. According to an exemplary embodiment, the linear spring 244 is positioned to bias the detent 266 of the trigger pin 260 into engagement with the detent aperture 216 of the trigger casing 210.

As shown in FIGS. 9-11, the return spring 250 includes a main portion, shown as engagement portion 252, and a second portion, shown as retainer portions 254, extending from the engagement portion 252. According to an exemplary embodiment, the retainer portions 254 are configured to be received by the spring recesses 228 of the housing supports 220 to couple the return spring 250 thereto. As shown in FIGS. 9 and 11, the engagement portion 252 of the return spring 250 is positioned to engage a rear face of the longitudinal body 232 of the trigger latch 230. According to an exemplary embodiment, the return spring 250 is configured to rotationally bias the trigger latch 230 such that the detent 266 of the trigger pin 260 aligns with and is received by the detent aperture 216 of the trigger casing 210.

As shown in FIGS. 9-12C, the trigger plug 270 has a body, shown as body 272, having a first protrusion, shown as plunger 274, extending from an upper face thereof. As shown in FIGS. 11-12C, the body 272 of the trigger plug 270 has a second protrusion, shown as nipple 276, extending from a lower face thereof. As shown in FIGS. 8-12C, the trigger 280 includes a first portion, shown as trigger body 282, and a second portion, shown as trigger rod 288. As shown in FIGS. 11-12C, the trigger body 282 has a protrusion, shown as protrusion 284, extending from a first face, shown as lower face 283, thereof. The protrusion 284 has a profile, shown as tapered profile 286. In other embodiments, the protrusion 284 has another type of profile (e.g., curved, vertical, etc.). As shown in FIGS. 11-12C, the trigger rod 288 is received by trigger body 282 and/or the protrusion 284 such that the trigger rod 288 extends therefrom. In one embodiment, the trigger rod 288 is fixedly coupled to the trigger body 282 (e.g., with an adhesive, etc.). In other embodiments, the trigger rod 288 is releasably coupled to the trigger body 282 (e.g., with a fastener, a snap fit, an interference fit, etc.). In still other embodiments, the trigger rod 288 is integrally formed with the trigger body 282 (e.g., a unitary component, etc.).

As shown in FIGS. 11-12C, the trigger plug 270 and the trigger body 282 are disposed within the trigger cavity 218 of the trigger casing 210. The trigger cap 290 is positioned to enclose the trigger cavity 218 to retain the trigger plug 270 and the trigger body 282 within the trigger cavity 218. As shown in FIGS. 9-12C, an inner surface, shown as inner face 291, of the trigger cap 290 defines a notch, shown as seat 292, that extends around the periphery of the inner face 291 of the trigger cap 290. As shown in FIGS. 11-12C, the seat 292 is configured to engage with a corresponding surface defined by the peripheral wall 212 of the trigger casing 210 to couple to the trigger housing 202. The trigger cap 290 may be coupled to the trigger housing 202 to enclose the trigger cavity 218 with adhesive, a snap fit, an interference fit, a fastener, etc. As shown in FIGS. 11-12C, the trigger cap 290 defines an aperture, shown as rod aperture 294, that has a profile, shown as tapered profile 296. In other embodiments, the rod aperture 294 has another type of profile (e.g., curved, vertical, etc.).

As shown in FIGS. 11-12C, the plunger 274 of the trigger plug 270 is slidably received within the detent aperture 216, opposite the detent 266 of the trigger pin 260. The trigger body 282 is positioned such that an opposing second face, shown as upper face 281, of the trigger body 282 engages with the nipple 276 of the trigger plug 270. The lower face 283 of the trigger body 282 is disposed along the inner face 291 of the trigger cap 290 such that the protrusion 284 extends within the rod aperture 294 and the trigger rod 288 extends through the rod aperture 294. According to an exemplary embodiment, the tapered profile 296 of the trigger cap 290 has an inverse relationship relative to the tapered profile 286 of the protrusion 284 of the trigger body 282. Such an inverse relationship between the tapered profile 286 of the protrusion 284 and the tapered profile 296 of the trigger cap 290 may thereby provide an omnidirectional trigger 280 (e.g., the trigger 280 may be activated from any angle, three hundred and sixty degree activation, etc.). In other embodiments, the trigger 280 is a bi-directional trigger (e.g., the trigger 280 may be activated in two directions, forward and backward, etc.). In still another embodiment, another type of trigger 280 is used.

As shown in FIGS. 12A-12C, the trigger assembly 200 is reconfigurable between a first configuration, shown as lock configuration 204, a second configuration, shown as intermediate configuration 206, and a third configuration, shown as release configuration 208. As shown in FIG. 12A, while the trigger assembly 200 is in the lock configuration 204, the detent 266 of the trigger pin 260 is positioned within the detent aperture 216 such that the trigger latch 230 is rotationally fixed and cannot pivot about the dowel pin 242. As shown in FIG. 12B, while the trigger assembly 200 is in the intermediate configuration 206, the trigger rod 288 is engaged (e.g., activated by an animal, etc.) such that the trigger body 282 pivots within the trigger cavity 218. Such pivoting of the trigger body 282 may thereby cause the upper face 281 of the trigger body 282 to push upward on the nipple 276 of the trigger plug 270 such that the plunger 274 slides within the detent aperture 216 and engages the detent 266, thereby compressing the linear spring 244. The compression of the linear spring 244 facilitates disengagement of the detent 266 from the detent aperture 216. As shown in FIG. 12C, while the trigger assembly 200 is in the release configuration 208, the disengagement of the detent 266 from the detent aperture 216 and the curved bottom surface 236 of the retaining element 234 facilitate pivotal movement of the trigger latch 230 about the dowel pin 242.

Figure 23:
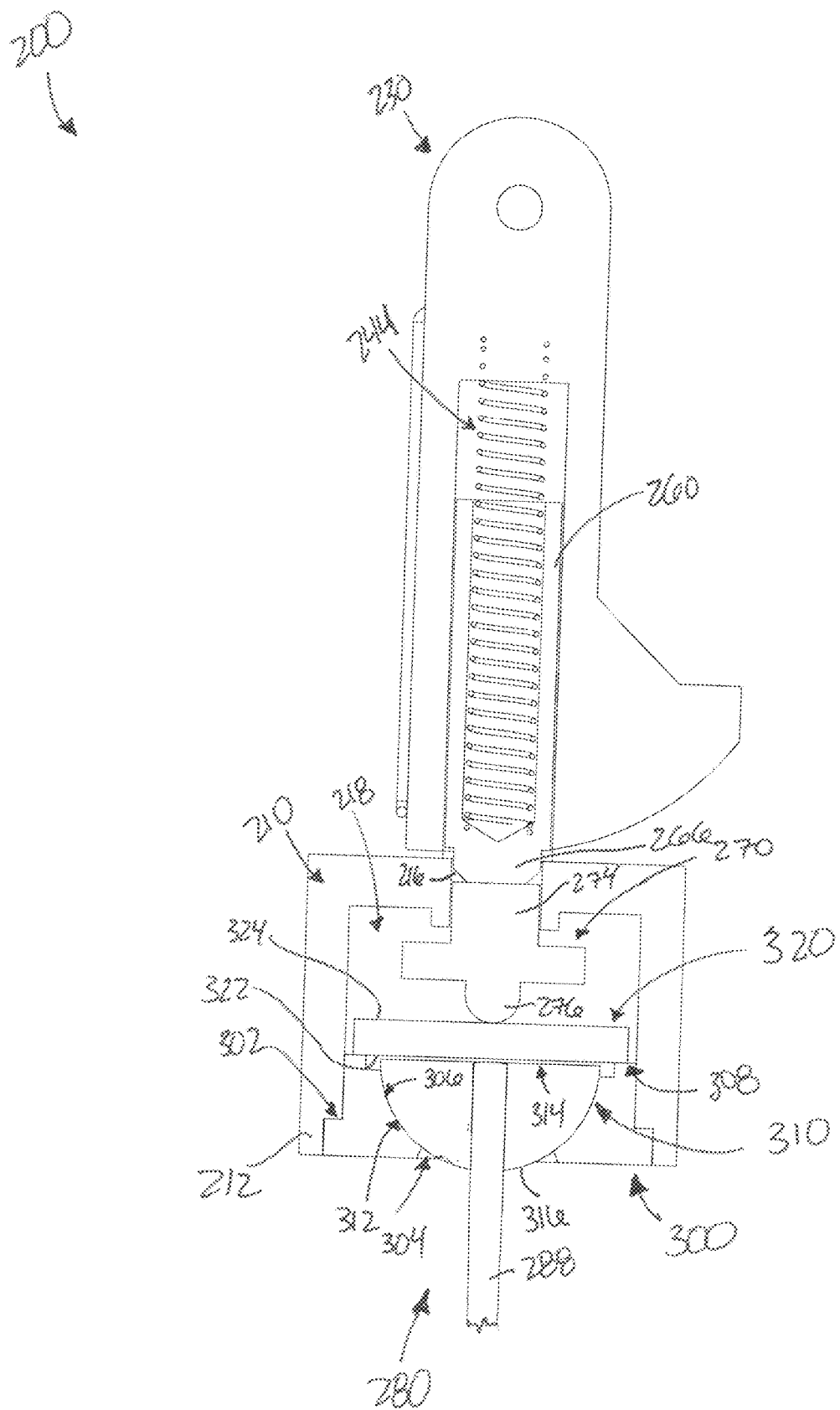
FIG. 23 is a detailed cross-sectional view of a trigger assembly, according to another exemplary embodiment.

As shown in FIG. 23, the trigger body 282 and the trigger cap 290 of the trigger assembly 200 are replaced with a second trigger cap, shown as trigger cap 300, a second trigger body, shown as trigger body 310, and a plate, shown as trigger plate 320. The trigger assembly 200 having the trigger cap 300, the trigger body 310, and the trigger plate 320 may advantageously have increased sensitivity and/or increased resistance to the entry of dirt and/or other debris into the trigger cavity 218 of the trigger casing 210. As shown in FIG. 23, the trigger body 310 has a profile, shown as curved profile 312, extending from a face, shown as upper face 314, thereof. The upper face 314 and the curved profile 312 cooperatively form a shape, shown as hemispherical shape 316, of the trigger body 310. As shown in FIG. 23, the trigger rod 288 is received by the trigger body 310 such that the trigger rod 288 extends therefrom. In one embodiment, the trigger rod 288 is fixedly coupled to the trigger body 310 (e.g., with an adhesive, etc.). In other embodiments, the trigger rod 288 is releasably coupled to the trigger body 310 (e.g., with a fastener, a snap fit, an interference fit, etc.). In still other embodiments, the trigger rod 288 is integrally formed with the trigger body 310 (e.g., a unitary component, etc.).

As shown in FIG. 23, the trigger plate 320 has a first side, shown as lower side 322, and an opposing second side, shown as upper side 324. As shown in FIG. 23, the trigger body 310 and the trigger plate 320 are disposed within the trigger cavity 218 of the trigger casing 210. The trigger cap 300 is positioned to enclose the trigger cavity 218 to retain the trigger body 310 and the trigger plate 320 within the trigger cavity 218. As shown in FIG. 23, the trigger cap 300 defines a notch, shown as seat 302, that extends around the periphery of the lower end of the trigger cap 300. The seat 302 is configured to engage with a corresponding surface defined by the peripheral wall 212 of the trigger casing 210 to couple to the trigger housing 202. The trigger cap 300 may be coupled to the trigger housing 202 to enclose the trigger cavity 218 with adhesive, a snap fit, an interference fit, a fastener, etc. As shown in FIG. 23, the trigger cap 300 defines an aperture, shown as rod aperture 304, and a cavity, shown as curved cavity 306. As shown in FIG. 23, the trigger cap 300 defines a ledge, shown as ledge 308, at the upper end thereof. The trigger plate 320 is positioned such that the lower side 322 thereof abuts the ledge 308 and encloses the trigger body 310 within the curved cavity 306 of the trigger cap 300.

As shown in FIG. 23, the curved cavity 306 of the trigger cap 300 is shaped to correspond with and receive the hemispherical shape 316 of the trigger body 310. The trigger body 310 may thereby freely pivot within the curved cavity 306 of the trigger cap 300. Such a relationship between the hemispherical shape 316 of the trigger body 310 and the curved cavity 306 of the trigger cap 300 may thereby provide an omnidirectional trigger 280 (e.g., the trigger 280 may be activated from any angle, three hundred and sixty degree activation, etc.). The trigger body 310 may also effectively seal the rod aperture 304 (e.g., such that dirt, debris, etc. do not enter the trigger cavity 218, etc.). According to an exemplary embodiment, the trigger body 310 is positioned such that the upper face 314 thereof selectively engages with lower side 322 of the trigger plate 320 (e.g., in response to pivoting within the curved cavity 306 of the trigger cap 300, etc.).

As shown in FIG. 23, the trigger body 310 is positioned such that the trigger rod 288 extends through the rod aperture 304. According to an exemplary embodiment, activation of the trigger rod 288 reconfigures the trigger assembly 200 between the lock configuration 204 and the release configuration 208. By way of example, engagement of the trigger rod 288 may cause the trigger body 310 to pivot within the curved cavity 306 of the trigger cap 300. Such pivoting of the trigger body 310 may thereby cause the upper face 314 of the trigger body 310 to push upward on lower side 322 of the trigger plate 320, pivoting the trigger plate 320 within the trigger cavity 218. The upper side 324 of the trigger plate 320 may thereby engage the nipple 276 of the trigger plug 270 such that the plunger 274 slides within the detent aperture 216 and engages the detent 266 of the trigger pin 260, thereby compressing the linear spring 244. The compression of the linear spring 244 facilitates disengagement of the detent 266 from the detent aperture 216, thereby releasing the trigger latch 230.

Figure 22:
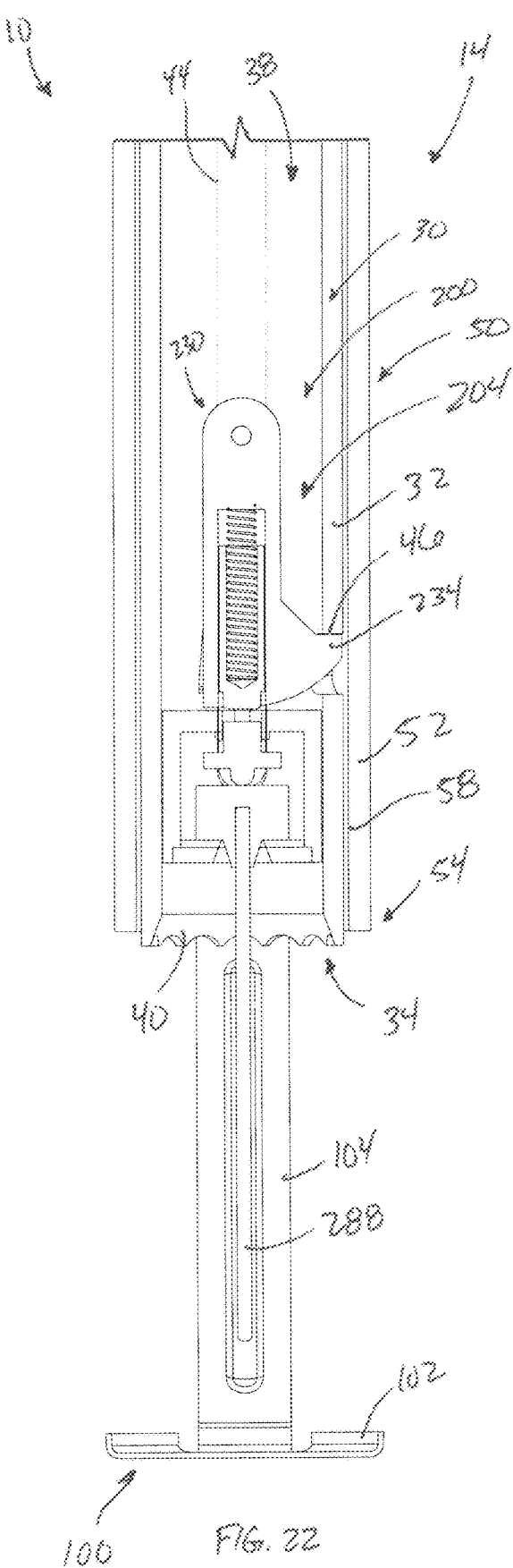
Figure 23A:
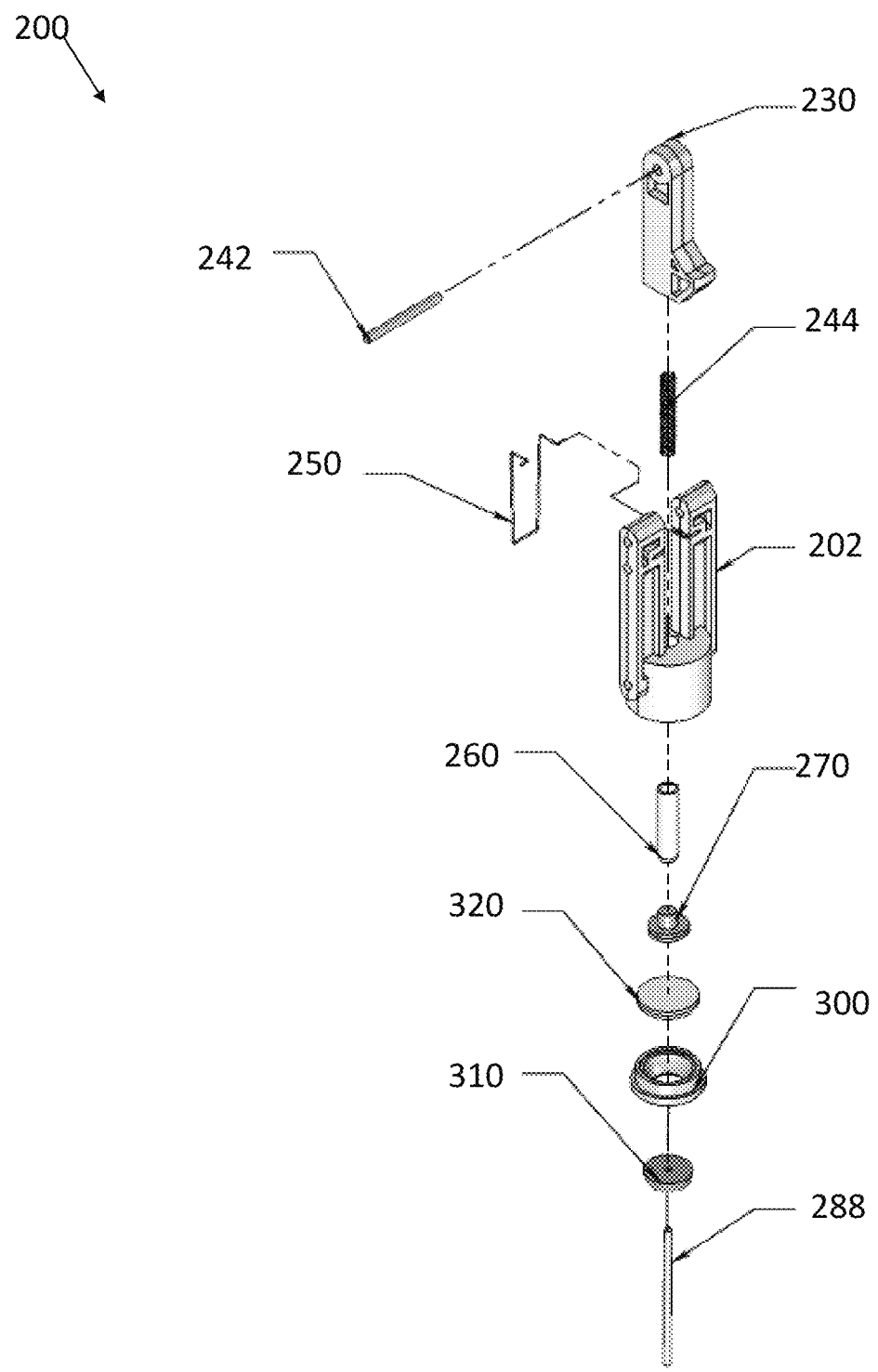
FIG. 23A is an exploded perspective view of a trigger assembly, according to an exemplary embodiment.

As shown in FIG. 23A, the trigger latch 230 as shown in FIG. 23 is replaced with the trigger latch 231. The trigger latch 231 can include a flat bottom surface 233 that is configured to slide along the trigger plug 270 and contact the trigger plate 320 in use. As shown in FIG. 23A, the trigger assembly includes the trigger housing 202, the trigger plug 270, the trigger cap 300, the trigger latch 230, the trigger pin 260, the trigger rod 288, the spring 250, the trigger body 310, the trigger housing 202, the trigger disk 320, the trigger pin 260, the pin 242, and/or the linear spring 244, among other components. FIGS. 22A-22F show the trigger assembly 200 of FIG. 23A in various configurations. The configurations illustrated in FIGS. 22A-22F can show the position of the trigger assembly 200 of any one of FIGS. 1-22 and 23-26.

Figure 14:
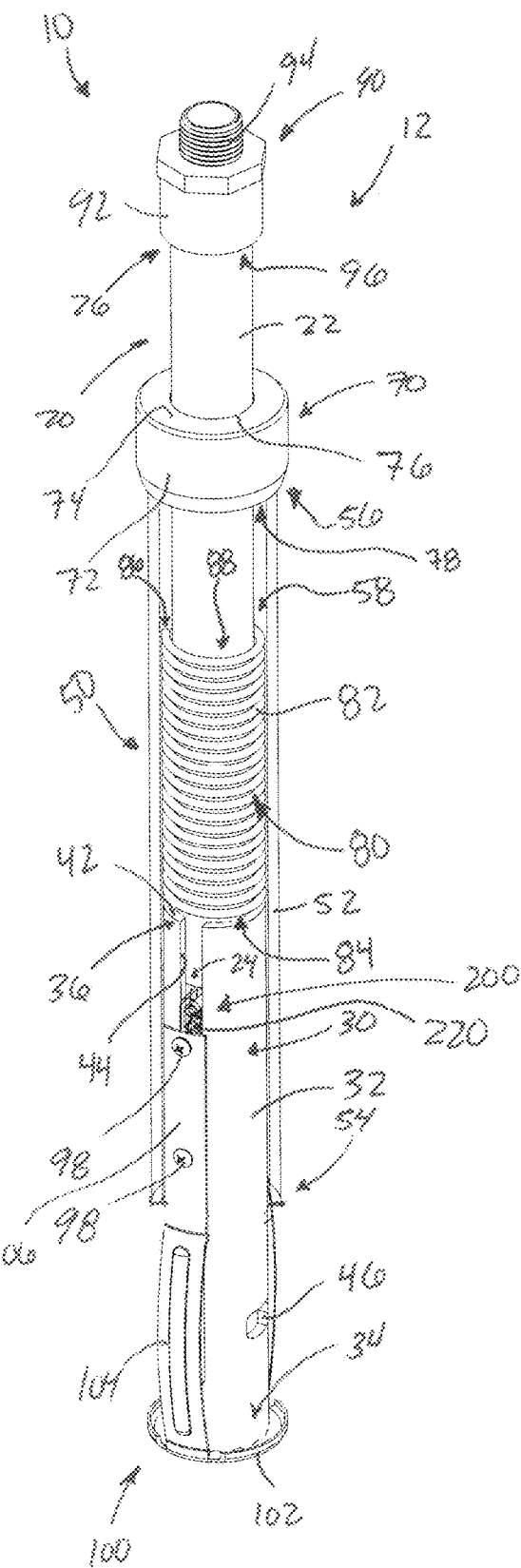
Figure 21:
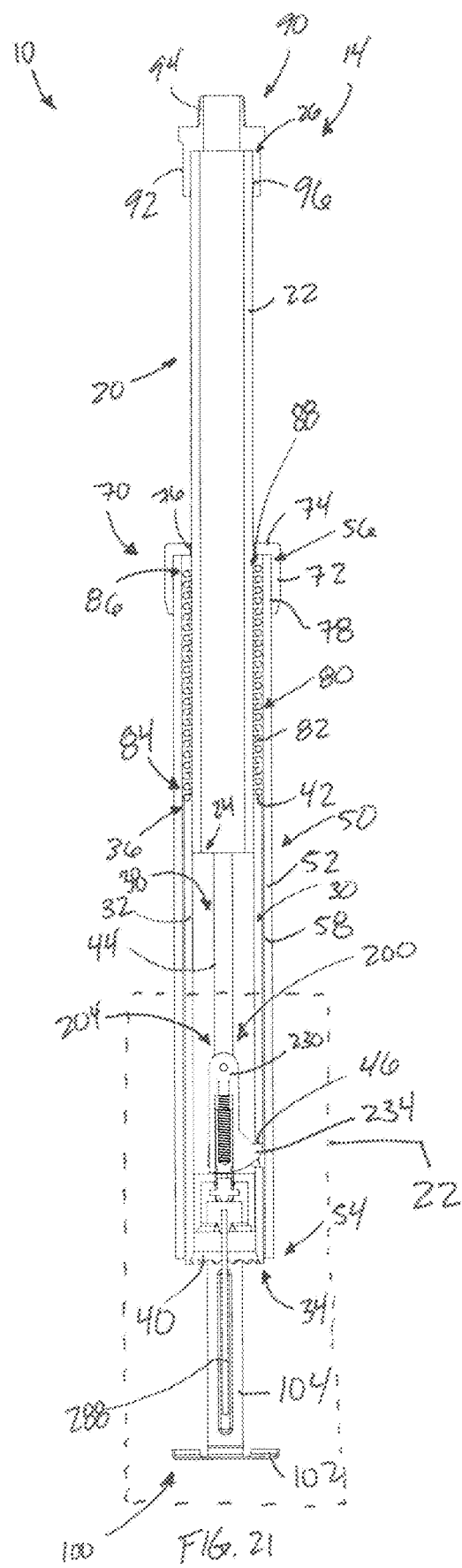

As shown in FIGS. 14-16 and 18-22, the trigger assembly 200 is disposed within the snare tube cavity 38 of the snare tube 30. As shown in FIGS. 14, 18, and 22, the housing supports 220 extend through the trigger slots 44 of the snare tube sidewall 32 such that an outer face of the housing supports 220 are positioned along (e.g., adjacent, contiguous, etc.) an interior surface of the housing sidewall 52. As shown in FIG. 20, the coupling apertures 222 of the housing supports 220 are positioned to align with the coupling apertures 60 of the housing 50. The coupling apertures 60 and the coupling apertures 222 receive the fasteners 98 to releasably couple the trigger assembly 200 to the lower end 54 of the housing 50. According to an exemplary embodiment, the trigger assembly 200 is fixed to the housing 50 such that the snare tube 30 translates relative to the trigger assembly 200 (e.g., facilitated by the trigger slots 44, etc.).

As shown in FIGS. 15-20, the trigger rod 288 extends from the lower end 54 of the housing 50 such that the trigger rod 288 is exposed within (e.g., dangles in, etc.) the snare passage 140 of the snare cup 100 (or the snare cup 110, the snare cup 120). According to an exemplary embodiment, engagement of the trigger rod 288 (e.g., by an animal passing through the snare passage 140, etc.) reconfigures the animal trap from the cocked configuration 14 to the deployed configuration 12.

As shown in FIGS. 17-22 and 22B, the trap 10 is arranged in the cocked configuration 14. The trap 10 may be arranged into the cocked configuration 14 in response to an operator pulling on the pull tube 20 (e.g., on a handle coupled to the pull tube 20 via the handle coupler 90, etc.) such that the upper end 26 of the pull tube 20 extends further from the spring cap 70 (e.g., relative to when arranged in the deployed configuration 12, etc.) and the lower end 34 of the snare tube 30 is retracted (e.g., drawn upward, etc.) into the housing cavity 58 of the housing 50 through the lower end 54 thereof. As shown in FIGS. 17-22, such retraction of the snare tube 30 presents the snare passage 140, thereby exposing the trigger rod 288 (e.g., the trigger slots 44 facilitate translation of the snare tube 30 relative to the trigger assembly 200, etc.).

As shown in FIGS. 18, 19, and 21, such retraction of the snare tube 30 causes the spring ledge 42 of the upper end 36 of the snare tube 30 to press up against the lower end 84 of the main spring 80 such that the upper end 86 of the main spring 80 engages with an interior surface of the plate 74 of the spring cap 70, thereby compressing the main spring 80 between the spring ledge 42 of the snare tube 30 and the plate 74 of the spring cap 70. According to an exemplary embodiment, the compression of the main spring 80 causes the main spring 80 to store elastic potential energy which provides a biasing force. The biasing force of the main spring 80 biases the trap 10 into the deployed configuration 12, however the trigger assembly 200 is configured to hold the trap 10 in the cocked configuration 14 until the trigger rod 288 is engaged, according to an exemplary embodiment.

As shown in FIGS. 18, 21, 22, and 22B, the trigger assembly 200 is arranged in the lock configuration 204 such that the retaining element 234 of the trigger latch 230 is positioned to engage with the retention aperture 46, thereby holding the trap 10 in the cocked configuration 14. According to an exemplary embodiment, as the trap 10 is reconfigured from the deployed configuration 12 into the cocked configuration 14, the return spring 250 forces the trigger latch 230 against the snare tube sidewall 32 such that as the retention aperture 46 passes by the retaining element 234, the trigger latch 230 is pivoted such that the retaining element 234 extends into the retention aperture 46 of the snare tube 30 (e.g., thereby holding the snare tube 30 in the cocked configuration 14, the trigger assembly 200 is reconfigured from the release configuration 208 to the lock configuration 204, etc.). Such pivoting of the trigger latch 230 aligns the trigger pin 260 with the detent aperture 216 of the trigger casing 210 such that linear spring 244 forces the detent 266 to engage with the detent aperture 216 (e.g., downward etc.), thereby pivotally fixing the trigger latch 230.

As shown in FIGS. 13-16, 22A, and 22F, the trap 10 is arranged in the unloaded and/or deployed configuration 12. The trap 10 may be arranged into the deployed configuration 12 in response to engagement of the trigger rod 288 (e.g., an animal passing though the snare passage 140, etc.) such that the upper end 26 of the pull tube 20 retracts toward the spring cap 70 (e.g., relative to when arranged in the cocked configuration 14, etc.) and the lower end 34 of the snare tube 30 is extended (e.g., forced downward, etc.) into the snare passage 140. As shown in FIGS. 13-16, such extension of the snare tube 30 at least partially encloses the snare passage 140.

FIG. 22C shows an exemplary embodiment of the trigger assembly 200 (for example, as shown in at least FIG. 23A, etc.) in a locked or loaded position with the trigger assembly actuated. As shown in at least FIG. 22C, the trigger rod 288 pivots from a longitudinal axis of the trigger assembly 200 until the trigger rod 288 reaches an activation angle α, such as when an animal moves the trigger rod 288. The activation angle α can be approximately 17°, approximately 10-12°, approximately 12-14°, approximately 14-16°, approximately 16-18°, approximately 18-20°, or any range therebetween or higher. When the trigger assembly 200 is actuated, such as when the trigger rod 288 reaches the activation angle α, the trigger plug 270 is pushed upwardly by the resultant movement of the disk 320. As shown in FIG. 22D, which is a close-up view of FIG. 22C, in the actuated position, a top surface 270 of the flange of the trigger plug 270 contacts an interior surface 273 of the trigger casing 210.

According to an exemplary embodiment, engagement (e.g., sufficient engagement, etc.) of the trigger rod 288 reconfigures the trigger assembly 200 from the lock configuration 204 to the release configuration 208 (e.g., see FIGS. 12A-12C, 22F, etc.) such that trigger latch 230 pivots and the retaining element 234 disengages from the retention aperture 46 of the snare tube 30 (e.g., see FIG. 22E). The disengagement of the retaining element 234 from the retention aperture 46 causes the biasing force of the main spring 80 (e.g., from the elastic potential energy stored by the compressed linear coil 82, etc.) to press against the spring ledge 42. The lower end 34 of the snare tube 30 may thereby be forced from the lower end 54 of the housing cavity 58 into the snare passage 140 of the snare cup 100 such that the serrated edge 40 of the lower end 34 of the snare tube 30 is pressed against the bottom plate 102 of the snare cup 100. In some embodiments, the bottom plate 102 defines an aperture or a depression (e.g., having an inverse shape of the serrated edge 40, etc.) positioned to receive the serrated edge 40 of the snare tube 30. By way of example, when an animal trips the trigger assembly 200 while in the lock configuration 204, the snare tube 30 is thereby released and forced downward from and out of the housing 50 by the main spring 80 such that the animal may become trapped (e.g., sandwiched, held, constrained, cinched, clamped, compressed, etc.) between the serrated edge 40 of lower end 34 of the snare tube 30 and the bottom plate 102 of the snare cup 100. The snare tube 30 may thereby function as a projectile object that strikes an animal (e.g., with projectile downward motion, etc.) to trap the animal within the snare cup 100 between the bottom plate 102 and the lower end 34 of the snare tube 30.

In some embodiments, the trap 10 includes and/or provides an indicator (e.g., a light, a transparent window, a flag, a sound, a notification, etc.) when the trap 10 is in the deployed configuration 12 (e.g., after trapping an animal, etc.). The trap 10 may thereby easily indicate whether the trap 10 is in the cocked configuration 14 or the deployed configuration 12 while inserted into the ground (e.g., without an operator having to remove the trap 10 to inspect it, etc.). By way of example, an indicator window or light (e.g., LED, etc.) positioned above the ground surface may be a first color (e.g., red, etc.) when the trap 10 is in the cocked configuration 14 and a second color (e.g., green, etc.) when the trap 10 is in the deployed configuration 12. By way of another example, a flag may actuate (e.g., flip up, etc.) in response to the trap 10 being tripped (e.g., deployed from the cocked configuration 14 into the deployed configuration 12, etc.). By way of yet another example, the trap 10 may include wireless communication capabilities (e.g., Bluetooth, Wi-Fi, radio, near field communication (NFC), etc.) configured to facilitate providing a signal or a notification to a user device or web account (e.g., a laptop, a smartphone, a tablet, a smartwatch, a PDA, a computer, a server, an email account, a user account on a website associated with the trap 10, etc.) in response to the trap 10 being tripped.

According to an exemplary embodiment, the trap 10 provides improved operation relative to traditional subterranean animal traps. By way of example, the snare cup 100 may be manufactured from a robust material (e.g., metal, etc.) that has increased reliability (e.g., increased work life, less failures, prevents corrosion, etc.) relative to traditional designs. By way of another example, cocking the trap 10 by pulling up on the pull tube 20 facilitates setting the animal trap (e.g., in the cocked configuration 14, etc.) prior to or after inserting the trap 10 into the ground (e.g., animal tunnel, etc.). Traditional designs may require an operator to pull on an outer tube of the trap to cock the trap. Traditional designs may also require that the trap be cocked after being inserted into the ground (e.g., which may increase the difficulty of setting the trap, etc.), otherwise the trap may become damaged while being inserted into the ground. By way of yet another example, the trigger assembly 200 substantially eliminates false triggering events that traditional designs may facilitate.

The present invention also relates to methods of using the animal traps described herein to trap and/or kill an animal.

In one aspect is provided a method of trapping and/or killing an animal, the method comprising: putting the animal trap into a cocked position and placing the animal trap into a hole in the ground such that at least a portion of the trap is underground. In some embodiments, the method further comprises mechanically striking the animal with the snare tube after the animal contacts the trigger, thereby trapping and/or killing the animal.

In one aspect is provided a method of using an animal trap, the method comprising the steps of: (a) providing an animal trap as described herein; (b) moving the snare tube into a cocked position; and (c) positioning at least a portion of the animal trap underground such that an animal can enter the passage and move the trigger, causing the snare tube to move into a deployed position.

In some embodiments, a bottom portion of the trap is inserted into an underground tunnel created by the animal. In some embodiments, at least a portion of the animal trap remains above ground.

In some embodiments, the animal is trapped. In some embodiments, the animal is killed.

Preferably, the animal is a burrowing animal. The animal may be, for example and without limitation, a rodent (e.g., a gopher, a groundhog, a mole, a rat, a woodchuck, a vole, a chipmunk, a muskrat, a prairie dog, or a squirrel), a skunk, a snake, or a lizard.

In some aspects, a method of setting an animal trap for trapping and/or killing an animal can include providing the animal trap. The animal trap can include an outer tubular member defining a first cavity; an inner tubular member defining a second cavity and including a retention feature, and a trigger assembly positioned within at least the first cavity and coupled to the outer tubular member. At least a portion of the inner tubular member can be positioned within the first cavity. The method can include pulling the inner tubular member relative to the outer tubular member to cause the inner tubular member to translate relative to the outer tubular member until a portion of the trigger assembly engages with the retention feature of inner tubular member.

In some embodiments, the retention feature is a retention aperture.

In some aspects, an animal trap can include a housing defining a first cavity and a snare cup coupled to an end portion of the housing. The snare cup can include bottom plate including a first side portion and a second side portion positioned opposite the first side portion; a first arm extending from the first side portion; a second arm extending from the second side portion; a first flange extending from the first arm and configured to be coupled to the housing; and a second flange extending from the second arm and configured to be coupled to the housing.

In some embodiments, a width of the first arm and the second arm is smaller than a width of the bottom plate. In some embodiments, the first arm and the second arm have an arc-like shape. In some embodiments, the first flange and the second flange are flat.

In some embodiments, the trap can include a snare tube defining a second cavity. The snare tube can be at least partially positioned within the first cavity of the housing, and the snare tube can be repositionable between a cocked position and a deployed position. In some embodiments, the trap can include a trigger assembly disposed at least partially within the second cavity of the snare tube.

Any of the parts, components, pieces, features, etc. as described herein may be part of a device for trapping animals. Some embodiments of the invention described herein relate to methods of using an animal trap having one or more of the components as described herein, alone or in combination with other elements as described.

For example, the device could incorporate the stopping pins as described herein. By way of further example, the device may comprise an outer tubular member defining a first cavity; an inner tubular member defining a second cavity and including a retention feature, wherein at least a portion of the inner tubular member is positioned within the first cavity, and a trigger assembly positioned within at least the first cavity and coupled to the outer tubular member. Alternatively, the device may comprise a snare cup coupled to an end portion of the housing, the snare cup including: a bottom plate including a first side portion and a second side portion positioned opposite the first side portion; a first arm extending from the first side portion; a second arm extending from the second side portion; a first flange extending from the first arm and configured to be coupled to the housing; and a second flange extending from the second arm and configured to be coupled to the housing.

It is important to note that the construction and arrangement of the elements of the systems, methods, and apparatuses as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations.

Embodiments have been described in connection with the accompanying drawings. However, it should be understood that the figures are not drawn to scale. Distances, angles, shapes, etc. are merely illustrative and do not necessarily bear an exact relationship to actual dimensions and layout of the articles that are illustrated. In addition, the foregoing embodiments have been described at a level of detail to allow one of ordinary skill in the art to make and use the articles, parts, different materials, etc. described herein. A wide variety of variation is possible. Articles, materials, elements, and/or steps can be altered, added, removed, or rearranged. While certain embodiments have been explicitly described, other embodiments will become apparent to those of ordinary skill in the art based on this disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or configurations are in any way required for one or more embodiments. The terms "comprising," "including," "having," and the like are synonymous and are used inclusively, in an open-ended fashion, and do not exclude additional elements, features, acts, operations, and so forth. The term "consisting essentially of" can be used anywhere where the terms comprising, including, containing or having are used herein, but consistent essentially of is intended to mean that the claim scope covers or is limited to the specified materials or steps recited and those that do not materially affect the basic and novel characteristic(s) of the claimed invention. Also, the term "consisting of" can be used anywhere where the terms comprising, including, containing or having are used herein, but consistent of excludes any element, step, or ingredient not specified in a given claim where it is used.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. An animal trap, comprising;
   an outer tubular member having a first lower end and a first upper end, and defining a first cavity;
   an inner tubular member having a second lower end and a second upper end, and defining a second cavity, wherein at least a portion of the inner tubular member is positioned within the first cavity of the outer tubular member, and wherein the inner tubular member is slidably repositionable relative to the outer tubular member between a cocked position and a deployed position;
   a resilient member positioned to bias the inner tubular member into the deployed position, wherein the resilient member is positioned within the first cavity of the outer tubular member and disposed around the inner tubular member;
   a bottom portion coupled to the first lower end of the outer tubular member, wherein at least one of the bottom portion and the first lower end of the outer tubular member define a passage;
   a trigger assembly positioned to selectively hold the inner tubular member in the cocked position, the trigger assembly including a trigger extending into the passage; and
   a cap positioned to enclose the first upper end of the outer tubular member;
   wherein the inner tubular member defines a ledge, wherein the resilient member is compressed between an interior surface of the cap and the ledge of the inner tubular member when the inner tubular member is in the cocked position.

2. The animal trap of claim 1, wherein activation of the trigger is configured to cause the trigger assembly to release the inner tubular member from the cocked position such that the resilient member forces the inner tubular member into the deployed position such that the second lower end of the inner tubular member projects through the passage.

3. The animal trap of claim 2, wherein the bottom portion includes a plate and a plurality of arms extending from the plate, wherein the plurality of arms couple the bottom portion to the first lower end of the outer tubular member such that the plate is spaced from the first lower end of the outer tubular member.

4. The animal trap of claim 1, wherein the cap defines an aperture, and wherein the second upper end of the inner tubular member extends through the aperture.

5. The animal trap of claim 1, wherein the trigger assembly is fixed relative to the outer tubular member.

6. The animal trap of claim 5, wherein the trigger assembly is coupled to the outer tubular member such that the inner tubular member translates relative to the outer tubular member and the trigger assembly.

7. The animal trap of claim 5, wherein the trigger assembly is disposed within the second cavity of the inner tubular member.

8. The animal trap of claim 7, wherein the inner tubular member defines a pair of slots that facilitate relative movement between the inner tubular member and the trigger assembly.

9. The animal trap of claim 8, wherein the trigger assembly includes a trigger housing having (i) a trigger casing defining a trigger cavity that receives at least a portion of the trigger and (ii) a pair of supports extending from the trigger casing, the pair of supports positioned to protrude through the pair of slots of the inner tubular member and couple the trigger housing to the outer tubular member.

10. The animal trap of claim 9, wherein the trigger assembly includes a latch pivotally coupled to the pair of supports and biased by a second resilient member such that the latch engages with a retention aperture of the inner tubular member to hold the inner tubular member in the cocked position, wherein the trigger includes a trigger rod extending from the trigger cavity into the passage, and wherein engagement of the trigger rod causes the trigger to disengage the latch from the retention aperture, thereby releasing the inner tubular member from the cocked position.

11. The animal trap of claim 10, wherein the latch defines a recess configured to receive a third resilient member and a trigger pin, wherein the trigger casing defines a detent aperture, wherein the third resilient member is configured to bias the trigger pin into engagement with the detent aperture to prevent inadvertent disengagement of the latch from the retention aperture, and wherein engagement of the trigger rod causes the trigger to disengage the trigger pin from the detent aperture, thereby facilitating disengagement of the latch from the retention aperture.

12. An animal trap, comprising;
   a first portion;
   a second portion coupled to the first portion, the second portion slidably repositionable relative to the first portion between a first position and a second position;
   a third portion coupled to an end of the first portion, the third portion including a plate spaced from the end of the first portion;
   a trigger assembly positioned to selectively hold the second portion in the first position such that an end of the second portion is spaced from the plate, the trigger assembly including a trigger;
   a biasing member disposed internally within the first portion, the biasing member positioned to force the second portion into the second position from the first position such that the end of the second portion engages with the plate in response to activation of the trigger, and the biasing member being positioned within the first portion and disposed around the second portion; and a cap positioned to enclose a first end of the first portion; wherein the second portion defines a ledge, wherein the biasing member is compressed between an interior surface of the cap and the ledge of the second portion when the second portion is in the first position.

13. The animal trap of claim 12, wherein the second portion translates relative to the first portion and the trigger assembly.

14. The animal trap of claim 13, wherein the second portion is internally disposed within the first portion.

15. The animal trap of claim 14, wherein the trigger assembly is internally disposed within the second portion.

16. The animal trap of claim 15, wherein the second portion defines a pair of slots, and wherein a housing of the trigger assembly includes a pair of extensions that extend through the pair of slots to couple the trigger assembly to the first portion.

17. An animal trap, comprising;
a housing defining a first cavity;
a snare tube defining a second cavity, a retention aperture, and a pair of slots extending longitudinally along a portion of a length of the snare tube, wherein the snare tube is positioned within the first cavity of the housing, and wherein the snare tube is repositionable between a cocked position and a deployed position;
a snare cup coupled to an end of the housing, the snare cup defining a passage;
a trigger assembly disposed within the second cavity of the snare tube, the trigger assembly including:
a trigger housing having (i) a trigger casing defining a trigger cavity and (ii) a pair of supports extending from the trigger casing, the pair of supports positioned to protrude through the pair of slots of the snare tube and couple the trigger housing to the housing;
a latch pivotally coupled to the pair of supports and biased to engage with the retention aperture of the snare tube to hold the snare tube in the cocked position; and
a trigger disposed within the trigger cavity of the trigger casing and having a trigger rod extending from the trigger cavity into the passage, wherein engagement of the trigger rod causes the trigger to disengage the latch from the retention aperture, thereby releasing the snare tube from the cocked position; and
a biasing member positioned to force the snare tube into the deployed position such that the snare tube projects into the passage in response to the latch disengaging from the retention aperture.

18. An animal trap, comprising;
an outer tubular member having a first lower end and a first upper end, and defining a first cavity;
an inner tubular member having a second lower end and a second upper end, and defining a second cavity, wherein at least a portion of the inner tubular member is positioned within the first cavity of the outer tubular member, and wherein the inner tubular member is slidably repositionable relative to the outer tubular member between a cocked position and a deployed position;
a resilient member positioned to bias the inner tubular member into the deployed position;
a bottom portion coupled to the first lower end of the outer tubular member, wherein at least one of the bottom portion and the first lower end of the outer tubular member define a passage; and
a trigger assembly positioned to selectively hold the inner tubular member in the cocked position, the trigger assembly including a trigger extending into the passage, wherein the trigger assembly is fixed relative to the outer tubular member, and wherein the trigger assembly is disposed within the second cavity of the inner tubular member;
wherein the inner tubular member defines a pair of slots that facilitate relative movement between the inner tubular member and the trigger assembly; and
wherein the trigger assembly includes a trigger housing having (i) a trigger casing defining a trigger cavity that receives at least a portion of the trigger and (ii) a pair of supports extending from the trigger casing, the pair of supports positioned to protrude through the pair of slots of the inner tubular member and couple the trigger housing to the outer tubular member.

* * * * *